United States Patent
Saeki et al.

(10) Patent No.: US 8,663,021 B2
(45) Date of Patent: Mar. 4, 2014

(54) TORQUE FLUCTUATION ABSORBER

(75) Inventors: Tomohiro Saeki, Anjo (JP); Atsushi Yamazumi, Kariya (JP); Yuki Miyamoto, Kariya (JP); Makoto Yokota, Kariya (JP); Chihiro Hayashi, Kariya (JP); Takashi Murate, Kariya (JP)

(73) Assignees: Aisin Seiki Kabushiki Kaisha, Kariya-Shi, Aichi-Ken (JP); Kojima Co., Ltd., Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/436,056

(22) Filed: Mar. 30, 2012

(65) Prior Publication Data
US 2012/0252588 A1 Oct. 4, 2012

(30) Foreign Application Priority Data

Mar. 31, 2011 (JP) ................................. 2011-078459

(51) Int. Cl.
*F16F 15/121* (2006.01)
(52) U.S. Cl.
USPC ....................... 464/64.1; 464/68.91
(58) Field of Classification Search
USPC .................. 464/64.1, 68.91, 83, 85; 192/209
See application file for complete search history.

(56) References Cited

U.S. PATENT DOCUMENTS

| 4,537,298 | A | * | 8/1985 | Loizeau ...................... 464/85 X |
| 5,690,553 | A | * | 11/1997 | Imanaka et al. ........... 464/68.91 |
| 6,923,725 | B2 | | 8/2005 | Takeuchi et al. |
| 7,445,553 | B2 | | 11/2008 | Nakagaito et al. |

FOREIGN PATENT DOCUMENTS

| IT | 596475 | * | 7/1959 | ...................... 464/85 |
| JP | 2-116036 U | | 9/1990 | |
| JP | 3-026341 Y | | 6/1991 | |
| JP | 5-002846 B2 | | 1/1993 | |
| JP | 5-034343 Y2 | | 8/1993 | |

* cited by examiner

*Primary Examiner* — Gregory Binda
(74) *Attorney, Agent, or Firm* — Buchanan Ingersoll & Rooney PC

(57) ABSTRACT

A torque fluctuation absorber includes a first rotating member arranged to be rotatable, a second rotating member arranged in a rotatable manner relative to the first rotating member, a coil spring for buffering a torsion between the first rotating member and the second rotating member by means of an elastic force, and a cushion member arranged at an inside of the coil spring and buffering the torsion between the first rotating member and the second rotating member by means of an elastic force, wherein the cushion member includes an elastic member formed in a columnar shape, and an abrasion resistant member partly covering a side surface of the elastic member and including a greater abrasion resistance than an abrasion resistance of the elastic member.

20 Claims, 17 Drawing Sheets

F I G. 5 A
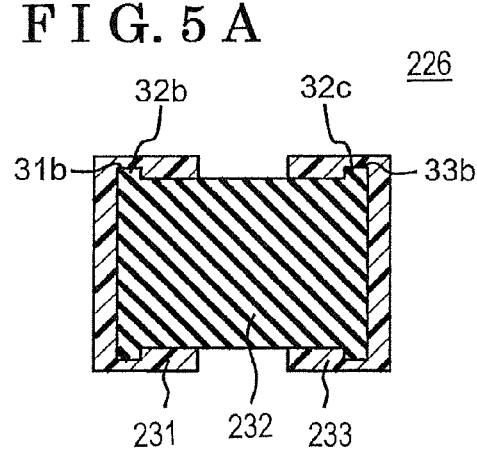
F I G. 5 B
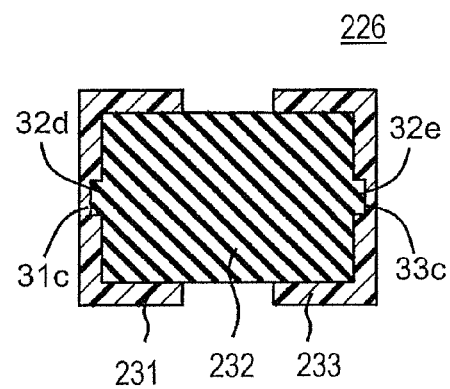
F I G. 5 C
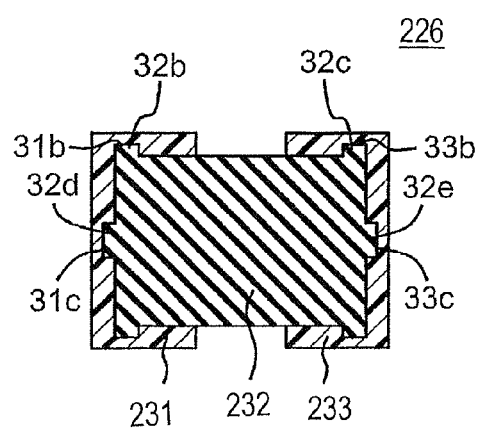
F I G. 5 D
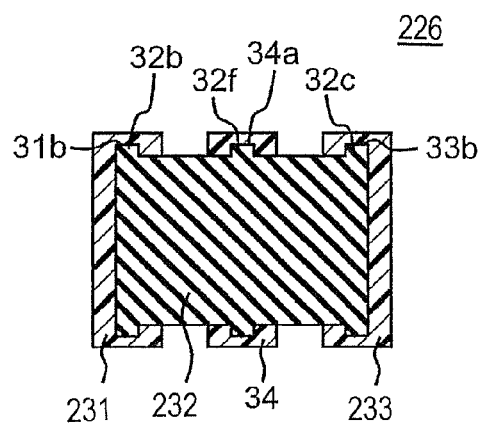

F I G. 9
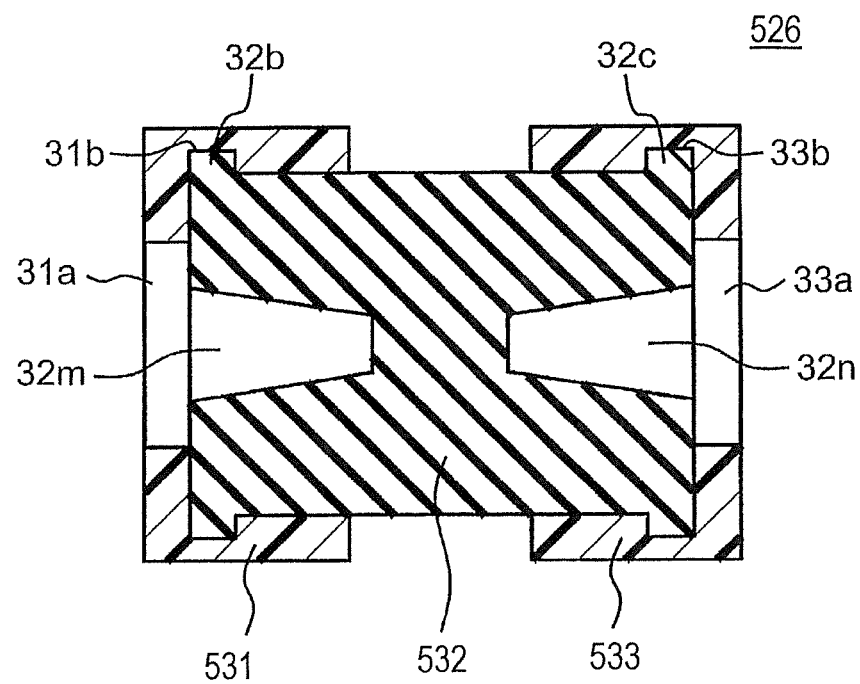

F I G. 12
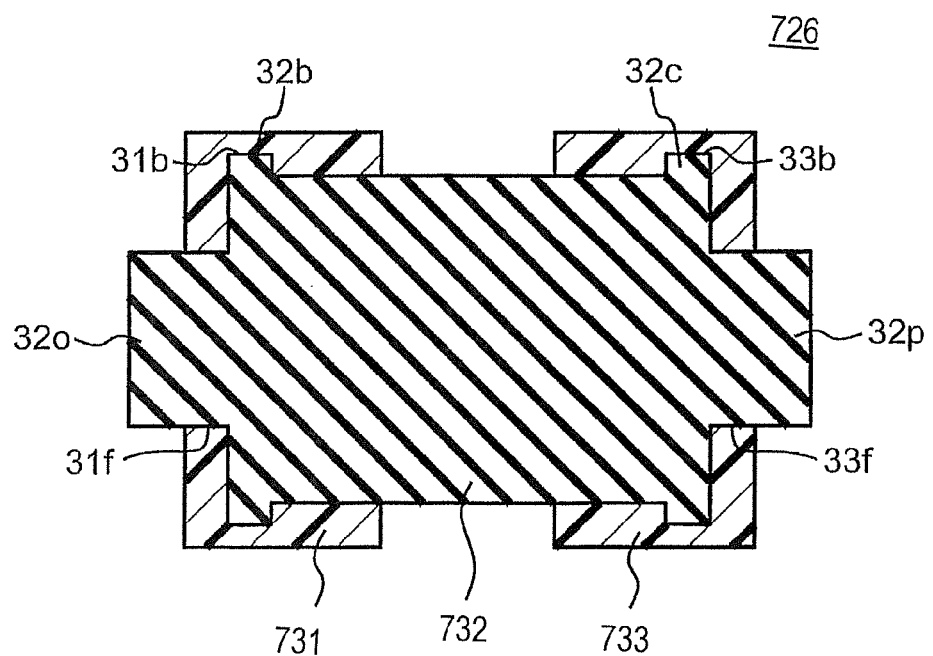

F I G. 15
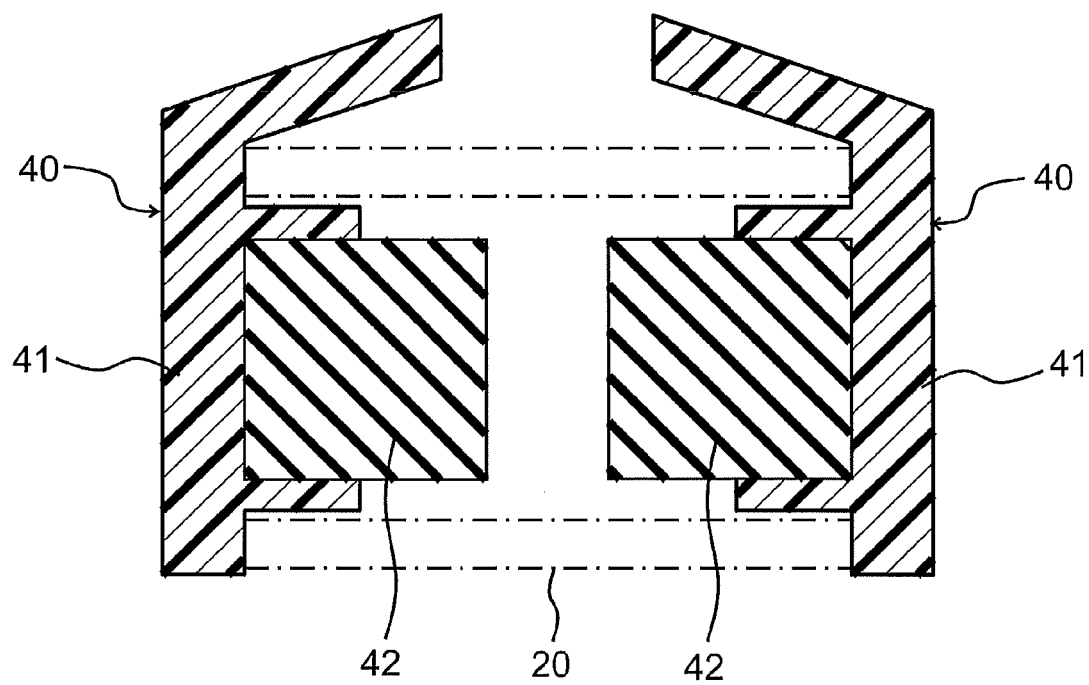

TORQUE FLUCTUATION ABSORBER

CROSS REFERENCE TO RELATED APPLICATIONS

This application is based on and claims priority under 35 U.S.C. §119 to Japanese Patent Application 2011-078459, filed on Mar. 31, 2011, the entire content of which is incorporated herein by reference.

TECHNICAL FIELD

This disclosure generally relates to a torque fluctuation absorber.

BACKGROUND DISCUSSION

A known torque fluctuation absorber is provided, for example, on a power transmission passage between an engine and a transmission, and absorbs (restrains) torque fluctuations generated by the engine and the transmission. The known torque fluctuation absorber includes, for example, a damper portion that absorbs the torque fluctuations by means of a spring force, a hysteresis portion that absorbs the torque fluctuations by means of a hysteresis torque generated by friction or the like, and a limiter portion that generates slippage when a torsion between respective rotating shafts of the engine and the transmission is beyond absorption capabilities of the damper portion and the hysteresis portion. At the damper portion, a coil spring is arranged on the power transmission passage between a rotating member of an input side and a rotating member of an output side, and seat members are arranged between the coil spring and the rotating member of the input side, and between the coil spring and the rotating member of the output side. In addition, the damper portion includes a stopper portion for restricting a torsion at the damper portion at a predetermined angle in order to protect the coil spring. At the stopper portion, a protrusion provided at the rotating member of the input side of the damper portion and a protrusion provided at the rotating member of the output side of the damper portion come into contact with each other, thereby restricting the torsion at the damper portion. In addition, at the damper portion, a cushion member is arranged at an inside of the coil spring so as to absorb an impact generated when the protrusions come into contact with each other at the stopper portion. In a case where the torsion occurs at the damper portion, the cushion member comes to be sandwiched between seat members each arranged at an end portion of the coil spring before the protrusions of the stopper portion come into contact with each other. Thus, the cushion member absorbs the impact generated when the protrusions of the stopper portion come into contact with each other. A known cushion member 126 (refer to FIG. 17), where abrasion resistant members 131, 133 (resin seats) are adhered to end portions of an elastic member 132 (rubber) is disclosed, for example, in JPH3-26341Y (hereinafter referred to as Patent reference 1) and in JPH5-34343Y (hereinafter referred to as Patent reference 2).

However, the known cushion member 126 is subject to a restriction in a lengthwise direction, in addition, a restriction is imposed in order to assure a dimension of each of the plural abrasion resistant members in the lengthwise direction thereof (because the abrasion resistant members are arranged in-line). Thus, a length of the elastic member 132 may be set to be short. As a result, an amount of stroke is small and an amount of impact absorbed is also small.

Further, according to the known cushion member 126, the elastic member 132 is joined to the abrasion resistant members 131, 133 by means of an adhesive joining. Thus, an adhesive strength may restrict the amount of stroke from increasing, which further reduces a shock absorbing ability. Still further, the elastic member 132 and the abrasion resistant members 131, 133 are joined with one another by means of the adhesive joining, which increases a production cost.

A need thus exists for a torque fluctuation absorber which is not susceptible to the drawback mentioned above.

SUMMARY

According to an aspect of this disclosure, a torque fluctuation absorber includes a first rotating member arranged to be rotatable, a second rotating member arranged in a rotatable manner relative to the first rotating member, a coil spring for buffering a torsion between the first rotating member and the second rotating member by means of an elastic force, and a cushion member arranged at an inside of the coil spring and buffering the torsion between the first rotating member and the second rotating member by means of an elastic force, wherein the cushion member includes an elastic member formed in a columnar shape, and an abrasion resistant member partly covering a side surface of the elastic member and including a greater abrasion resistance than an abrasion resistance of the elastic member.

BRIEF DESCRIPTION OF THE DRAWINGS

The foregoing and additional features and characteristics of this disclosure will become more apparent from the following detailed description considered with the reference to the accompanying drawings, wherein:

FIG. 5A is a cross-sectional view schematically illustrating a structure of a cushion member of a damper portion of a torque fluctuation absorber according to a second embodiment disclosed here;

FIG. 5B is a cross-sectional view schematically illustrating the structure of the cushion member of the damper portion of the torque fluctuation absorber according to the second embodiment;

FIG. 5C is a cross-sectional view schematically illustrating the structure of the cushion member of the damper portion of the torque fluctuation absorber according to the second embodiment;

FIG. 5D is a cross-sectional view schematically illustrating the structure of the cushion member of the damper portion of the torque fluctuation absorber according to the second embodiment;

FIG. 9 is a cross-sectional view schematically illustrating a structure of a cushion member of a damper portion of a torque fluctuation absorber according to a fifth embodiment disclosed here;

FIG. 12 is a cross-sectional view schematically illustrating a structure of a cushion member of a damper portion of a torque fluctuation absorber according to an eighth embodiment disclosed here;

FIG. 15 is a cross-sectional view schematically illustrating a structure of a cushion member of a damper portion of a torque fluctuation absorber according to an eleventh embodiment disclosed here;

DETAILED DESCRIPTION

Figure 1:
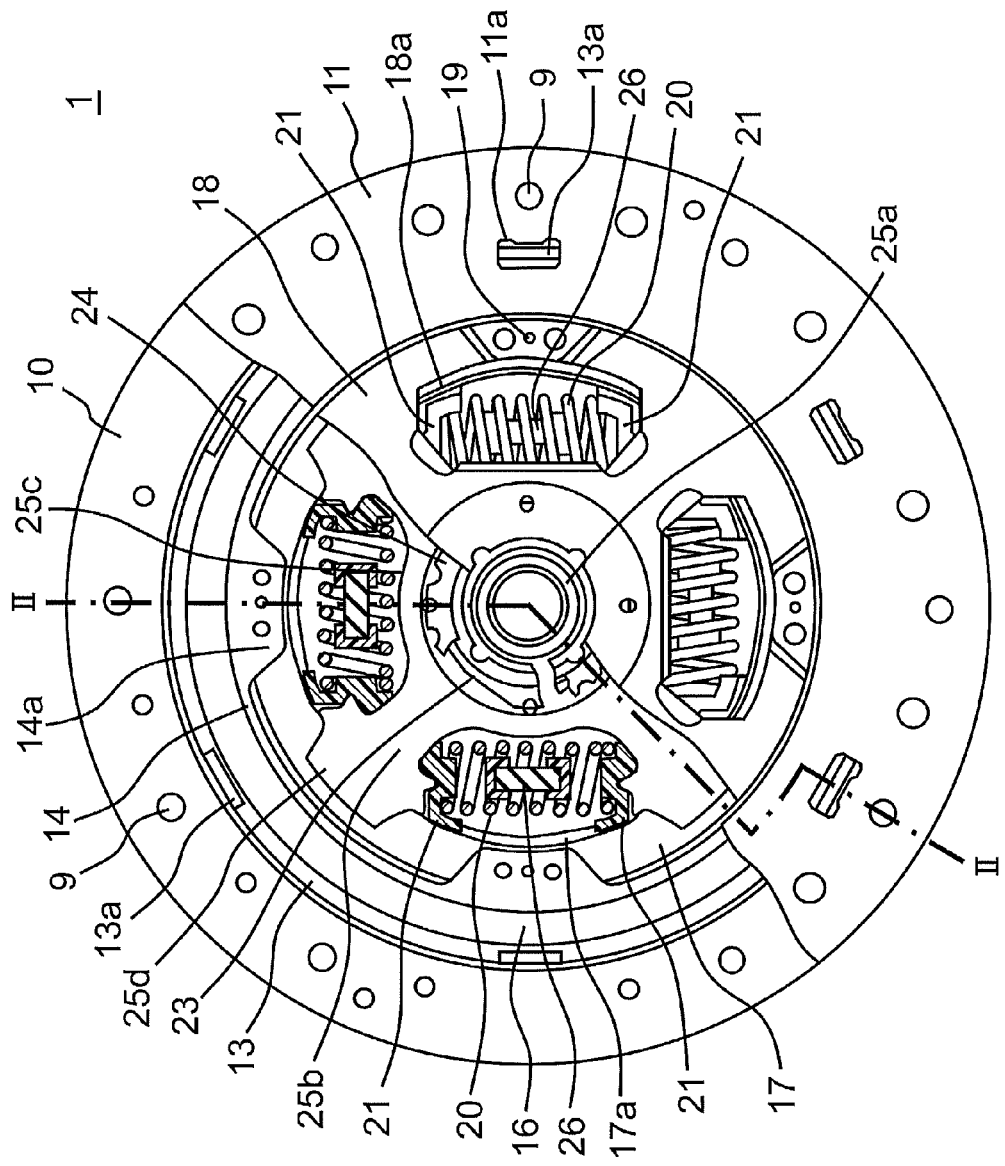
FIG. 1 is a plan view schematically illustrating a structure of a torque fluctuation absorber according to a first embodiment disclosed here.
Figure 2:
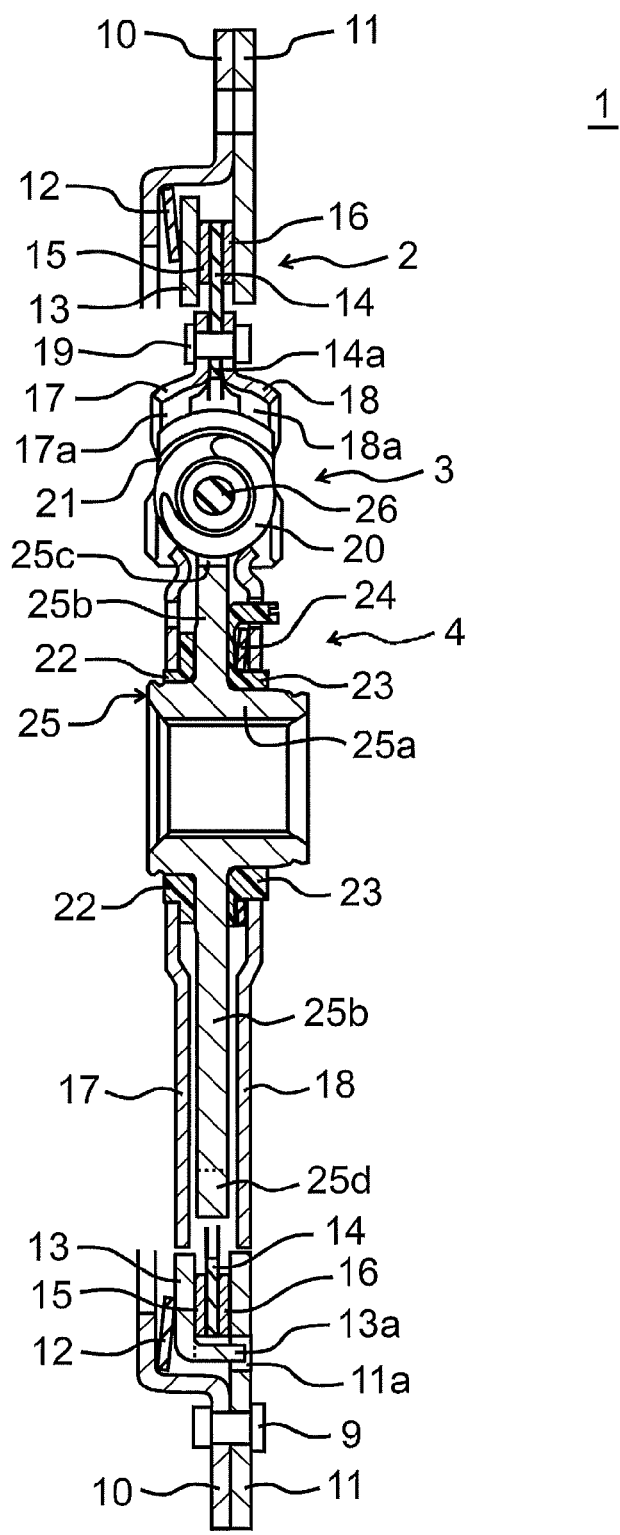
FIG. 2 is a cross-sectional view taken along line II-II in FIG. 1 and schematically illustrating the structure of the torque fluctuation absorber according to the first embodiment.

A torque fluctuation absorber according to below-mentioned embodiments includes first and second side plates 17, 18 (refer to FIG. 2) arranged to be rotatable, a hub member 25 (refer to FIG. 2) arranged in the rotatable manner relative to the first and second side plates 17, 18, a coil spring 20 (refer to FIG. 2) for buffering a torsion between the first and second side plates 17, 18 and the hub member 25 by means of an elastic force, and a cushion member 26 (refer to FIG. 1) arranged at an inside of the coil spring 20 and buffering the torsion between the first and second side plates 17, 18 and the hub member 25 by means of an elastic force, wherein the cushion member 26 includes an elastic member 32 (refer to FIG. 3A) formed in a columnar shape, and an abrasion resistant member 31, 33 (refer to FIG. 3A) partly covering a side surface of the elastic member 32 and including a greater abrasion resistance than an abrasion resistance of the elastic member 32.

In this specification, reference numbers used for referring to the drawing serve to facilitate understanding and are not for limited to the forms of application shown in the drawings.

The torque fluctuation absorber of a first embodiment will be explained with reference to FIGS. 1 to 3F.

The torque fluctuation absorber 1 of the first embodiment is provided, for example, on a power transmission passage between a crankshaft (an output shaft) coupled to an engine (an internal combustion engine) and an input shaft coupled to a transmission so as to absorb (restrain) torque fluctuations caused by the torsion (that is, torsional vibrations) generated between the above-mentioned rotation shafts, that is, the input shaft and the output shaft. The torque fluctuation absorber 1 includes a damper portion 3, a hysteresis portion 4 and a limiter portion 2. The damper portion 3 has a torsion-buffering function and absorbs the torque fluctuations between the rotation shafts by means of a spring force. The hysteresis portion 4 absorbs (restrains) the torque fluctuations between the rotation shafts by means of a hysteresis torque generated by friction or the like. The limiter portion 2 is configured to slip in a case where the torsion between the output shaft and the input shaft exceeds amounts of the torsion absorbable at the damper portion 3 and the hysteresis portion 4, and when the torque is equal to or greater than a predetermined torque. The damper portion 3 is placed parallelly with the hysteresis portion 4 on the power transmission passage. The limiter portion 2 is placed serially with the damper portion 3 and with the hysteresis portion 4 on the power transmission passage.

The torque fluctuation absorber 1 includes a rivet 9, a support plate 10, a cover plate 11, a disc spring 12, a pressure plate 13, a lining plate 14, friction members 15, 16, the first side plate 17 (i.e., a first rotating member), the second side plate 18 (i.e., the first rotating member), a rivet 19, the coil spring 20, a seat member 21, a first thrust member 22, a second thrust member 23, a disc spring 24, the hub member 25 (i.e., a second rotating member) and the cushion member 26.

The rivet 9 is a member for fastening the support plate 10 and the cover plate 11 integrally with each other.

The support plate 10, which is formed into a ring shape and supports a radially outward end portion of the disc spring 12, constitutes the limiter portion 2. The support plate 10 is joined to the cover plate 11 at a radially outward end portion of the support plate 10 and is fixed to the cover plate 11 by means of the rivet 9. The support plate 10 is, together with the cover plate 11, fixedly attached by means of a bolt to a flywheel coupled to the crankshaft of the engine. The support plate 10 rotates integrally with the cover plate 11. A radially inward portion of the support plate 10 is axially spaced from the cover plate 11. The support plate 10 is pressed against the radially outward end portion of the disc spring 12.

The cover plate 11, which is formed into a ring shape and covers the limiter portion 2, constitutes the limiter portion 2. The cover plate 11 is joined to the support plate 10 at a radially outward end portion of cover plate 11 and is fixed to the support plate 10 by means of the rivet 9. The cover plate 11, together with the support plate 10, is fixedly attached by means of the bolt to the flywheel coupled to the crankshaft of the engine. A radially inward portion of the cover plate 11 is axially spaced from the support plate 10. The cover plate 11 includes a hole 11a which supports the pressure plate 13 in a manner that the pressure plate 13 is movable in the axial direction but the pressure plate 13 does not rotate relative to the cover plate 11. A protruding portion 13a of the pressure plate 13 is inserted into the hole 11a so as to be movable in the axial direction but so as not to rotate relative to the cover plate 11. The radially inward portion of the cover plate 11 is slidably pressed against the friction member 16. The cover plate 11 may be made of a material that is less likely to rust (desirably, for example, a stainless material) than iron so that the cover plate 11 is restricted from sticking to the friction member 16 due to the rust.

The disc spring 12 formed into a disc shape, which is placed axially between the support plate 10 and the pressure plate 13, constitutes the limiter portion 2. The disc spring 12 is supported by the support plate 10 at the radially outward end portion of the disc spring 12, and biases the pressure plate 13 toward the cover plate 11 at the radially inward end portion of the disc spring 12.

The pressure plate 13, which is formed into a ring shape and is placed axially between the disc spring 12 and the friction member 15, constitutes the limiter portion 2. The pressure plate 13 includes the protruding portion 13a by which the pressure plate 13 is supported relative to the cover plate 11 so as to be movable in the axial direction but so as not to rotate relative to the cover plate 11. The protruding portion 13a is inserted into the hole 11a of the cover plate 11 so as to be movable in the axial direction but so as not to rotate relative to the cover plate 11. The pressure plate 13 is biased toward the friction member 15 by the disc spring 12. The pressure plate 13 is slidably pressed against the friction member 15. The pressure plate 13 may be made of a material that is less likely to rust than iron (desirably, for example, a stainless material) so that the pressure plate 13 is restricted from sticking to the friction member 15 due to the rust.

The lining plate 14 is formed into a ring shape and is disposed axially between the friction members 15 and 16, both of which are positioned between the cover plate 11 and the pressure plate 13. The lining plate 14 constitutes the limiter portion 2. The lining plate 14 includes a stopper portion 14a, for example, plural stopper portions 14a, formed at a radially inward end portion of the lining plate 14 to protrude radially inwardly. The stopper portion 14a, which restricts the torsion at the damper portion 3 at a predetermined angle, restricts the torsion from further occurring at the damper portion 3 by coming in contact with a stopper portion 25d provided at the hub member 25 when the torsion occurs at the damper portion 3. The stopper portion 14a is positioned to be sandwiched by the first side plate 17 and the second side plate 18, and is integrally fastened to the first side plate 17 and to the second side plate 18 by means of the rivet 19. The lining plate 14 is arranged so that a radially outward portion thereof is positioned axially between the friction members 15 and 16, and thus the friction members 15 and 16 are held by (for example, fixedly attached to, adhered to, or riveted to) the radially outward portion of the lining plate 14.

The friction member 15, which is placed axially between the lining plate 14 and the pressure plate 13, constitutes the limiter portion 2. The friction member 15 is formed into a ring shape. The friction member 15 is fixedly attached to the lining plate 14. The friction member 15 is slidably pressed against the pressure plate 13. The friction member 15 may be made of, for example, rubber, resin, fiber (short fiber or long fiber) or a material including particles for adjusting the friction coefficient μ.

The friction member 16, which is placed axially between the lining plate 14 and the cover plate 11, constitutes the limiter portion 2. The friction member 16 is formed into a ring shape and is fixedly attached to the lining plate 14. The friction member 16 is slidably pressed against the cover plate 11. The friction member 16 may be made of, for example, rubber, resin, fiber (short fiber or long fiber) or a material including particles for adjusting the friction coefficient μ.

The first side plate 17, which is formed into a ring shape and is placed axially between a flange portion 25b of the hub member 25 and the engine (on the left side of the flange portion 25b in FIG. 2), constitutes the damper portion 3 and the hysteresis portion 4. The first side plate 17 is, at a portion in a vicinity of a radially outward end portion of the first side plate 17, integrally fastened to the lining plate 14 and to the second side plate 18 by means of the rivet 19. The first side plate 17 includes, at the damper portion 3 that is positioned in a radially intermediate portion of the first side plate 17, an opening portion 17a for accommodating the coil spring 20 and the seat member 21, for example, a pair of the seat members 21. Circumferential end surfaces of the opening portion 17a are arranged so as to be in and out of contact with the seat members 21 respectively. The first side plate 17 engages with the first thrust member 22 so as to be movable in the axial direction but so as not to rotate relative to the first thrust member 22 at the hysteresis portion 4 which is positioned at a radially more inward portion than the damper portion 3. The first side plate 17, at a radially inward end portion thereof, is rotatably supported by the hub member 25 (a hub portion 25a) via the first thrust member 22.

The second side plate 18, which is formed into a ring shape and is placed axially between the flange portion 25b of the hub member 25 and the transmission (on the right side of the flange portion 25b in FIG. 2), constitutes the damper portion 3 and the hysteresis portion 4. The second side plate 18 is, at a portion in a vicinity of a radially outward end portion of the second side plate 18, integrally fastened to the lining plate 14 and to the first side plate 17 with the rivet 19. The second side plate 18 includes, at the damper portion 3 that is positioned in a radially intermediate portion of the second side plate 18, an opening portion 18a for accommodating the coil spring 20 and the seat members 21. Circumferential end surfaces of the opening portion 18a are arranged so as to be in and out of contact with the seat members 21 respectively. At the hysteresis portion 4 which is positioned at the radially more inward portion than the damper portion 3, the second side plate 18 is in contact with the second thrust member 23 so as to be movable in the axial direction but so as not to slide relative to the second thrust member 23, and supports the disc spring 24. The second side plate 18, at a radially inward end portion thereof, is supported by the hub member 25 (the hub portion 25a) via the second thrust member 23 so as to be rotatable relative to the hub member 25.

The rivet 19 fastens the lining plate 14, the first side plate 17 and the second side plate 18 integrally with one another.

The coil spring 20, which constitutes the damper portion 3, is accommodated in the opening portion 17a, the opening portion 18a and an opening portion 25c that are formed at the first side plate 17, the second side plate 18 and the hub member 25 (the flange portion 25b) respectively. The coil spring 20 is in contact with the seat members 21 that are arranged at longitudinal ends of the coil spring 20. The coil spring 20 is compressed in a case where the first and second side plates 17, 18, and the hub member 25 rotate relative to each other, and absorbs a shock generated by a rotational difference between the first and second side plates 17, 18, and the hub member 25. That is, the coil spring 20 buffers the torsion between the first and second side plates 17, 18, and the hub member 25. The coil spring 20 may be formed to have a straight shape in a longitudinal direction thereof. Alternatively, the coil spring 20 may be formed into the straight shape, and then may be bent to form an arc in the circumferential direction of the first and second side plates 17, 18 while being assembled. An arc spring having the arc shape in the circumferential direction of the first and second side plates 17, 18 may be used so as to respond to a large torsion.

The seat member 21, which constitutes the damper portion 3, is accommodated in the opening portion 17a, the opening portion 18a and the opening portion 25c that are formed at the first side plate 17, the second side plate 18 and the hub member 25 (the flange portion 25b) respectively. The seat member 21 is arranged between the circumferential end surface of the opening portions 17a, 18a, 25c, and the longitudinal end of the coil spring 20. The seat member 21 may be made of resin so as to decrease abrasion of the coil spring 20.

The first thrust member 22, which constitutes the hysteresis portion 4, is formed into a ring shape and is arranged axially between the first side plate 17 and the hub member 25. The first thrust member 22 is arranged between the first side plate 17 and the flange portion 25b in the axial direction. The first thrust member 22 engages with the first side plate 17 so as to be movable in the axial direction but so as not to rotate relative to the first side plate 17, and is slidably pressed against the first side plate 17. The first thrust member 22 is arranged between the first side plate 17 and the hub portion 25a also in the radial direction, and serves as a sliding bearing (a bush) supporting the first side plate 17 so that the first side plate 17 rotates relative to the hub portion 25a.

The second thrust member 23, which constitutes the hysteresis portion 4, is formed into a ring shape and is arranged axially between the second side plate 18 and the hub member 25. The second thrust member 23 is arranged between the disc spring 24 and the flange portion 25b in the axial direction. The second thrust member 23 engages with the second side plate 18 so as to be movable in the axial direction but so as not to rotate relative to the second side plate 18, and is biased by the disc spring 24 toward the flange portion 25b. The second thrust member 23 is slidably pressed against the flange portion 25b. The second thrust member 23 is arranged between the second side plate 18 and the hub portion 25a also in the radial direction, and serves as the sliding bearing (the bush) supporting the second side plate 18 so that the second side plate 18 rotates relative to the hub portion 25a.

The disc spring 24 is a disc-shaped spring constituting the hysteresis portion 4. The disc spring 24 is provided between the second thrust member 23 and the second side plate 18 so as to bias the second thrust member 23 toward the flange portion 25b.

The hub member 25 constitutes the damper portion 3 and the hysteresis portion 4, and outputs a rotative power which is transmitted from the damper portion 3 and the hysteresis portion 4 to the transmission. The hub member 25 includes the flange portion 25b radially outwardly extending from an outer circumferential surface of the hub portion 25a. An inner circumferential surface of the hub portion 25a is spline-engaged with the input shaft of the transmission that is coupled to the transmission. The hub portion 25a, at the outer circumferential surface thereof, rotatably supports the first side plate 17 via the first thrust member 22, and rotatably supports the second side plate 18 via the second thrust member 23. The flange portion 25b includes, at the damper portion 3, the opening portion 25c for accommodating the coil spring 20 and the seat members 21. Circumferential end surfaces of the opening portion 25c are arranged so as to be in and out of contact with the seat members 21. At the hysteresis portion 4 which is positioned at the radially more inward portion than the damper portion 3, the flange portion 25b is, specifically, surfaces of the flange portion 25b which face the axial direction are, slidably sandwiched between the first thrust member 22 and the second thrust member 23. The flange portion 25b includes the stopper portion 25d, for example, the plural stopper portions 25d, formed at a radially outward end portion of the flange portion 25b so as to protrude radially outwardly. The stopper portion 25d restricts the torsion at the damper portion 3 at the predetermined angle, that is, the stopper portion 25d restricts the torsion at the damper portion 3 by coming in contact with the stopper portion 14a when the torsion occurs at the damper portion 3.

The cushion member 26 absorbs a shock generated in a case where the torsion occurs at the damper portion 3, and thus when the stopper portion 25d of the hub member 25 and the stopper portion 14a of the lining plate 14 come in contact with each other. That is, the cushion member 26 buffers the torsion between the hub member 25 and the lining plate 14 integrally rotating with the first and second side plates 17, 18.

The cushion member 26 is formed in a cylindrical shape and is arranged at an inside of the coil spring 20. In a case where the torsion occurs at the damper portion 3, the cushion member 26 remains in a free state until the cushion member 26 comes to be sandwiched, that is, comes in contact with the pair of seat members 21 in a sandwiched manner. The cushion member 26 comes to be sandwiched between the pair of seat members 21 before the stopper portion 25d of the hub member 25 and the stopper portion 14a of the lining plate 14 come in contact with each other.

Figure 3A:
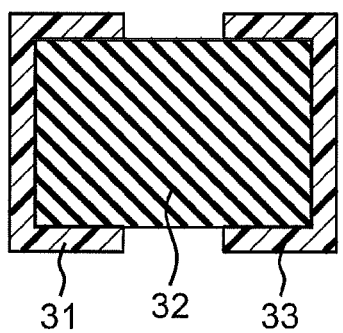
FIG. 3A is a cross-sectional view schematically illustrating a structure of a cushion member of a damper portion of the torque fluctuation absorber according to the first embodiment.

The cushion member 26 is constituted by the pair of abrasion resistant members 31, 33 and the elastic member 32 formed into the columnar shape, for example, a cylindrical shape (refer to FIG. 3A). The cushion member 26 includes the abrasion resistant member 31 (i.e., a first abrasion resistant member) provided at a first end of the elastic member 32 and the abrasion resistant member 33 (i.e., a second abrasion resistant member) provided at a second end of the elastic member 32. The abrasion resistant members 31 and 33 are arranged so as to be apart from each other in a lengthwise direction of the cushion member 26. The abrasion resistant members 31, 33 partly cover the side surface of the elastic member 32, and cover end surfaces of the elastic member 32. In this disclosure, the side surface of the elastic member corresponds to a surface other than bottom surfaces (that is, the end surfaces) of the elastic member formed into the columnar shape. In other words, the side surface of the elastic member corresponds to an outer circumferential surface of the elastic member. Thus, also part of the elastic member 32, the part which is positioned at an inner circumference of the abrasion resistant members 31, 33, is allowed to deform, thereby increasing a stroke, that is, an amount of stroke of compression and expansion (that is, recovery from the compressed state). In addition, because the part of the elastic member 32 is positioned at the inner circumference of the abrasion resistant members 31, 33, the abrasion resistant members 31, 33 do not need to be adhered to the elastic member 32. Each of the abrasion resistant member 31, 33 is configured to be in and out of contact with the corresponding seat member 21 (refer to FIG. 1) at a portion covering the end surface of the elastic member 32. Further, the abrasion resistant members 31, 33 restrict the elastic member 32 from coming in contact with the coil spring 20 (refer to FIG. 2). An elastically deformable material, for example, rubber or elastomer resin, may be used for the elastic member 32. For the abrasion resistant members 31, 33, material having the greater abrasion resistance than the material of the elastic member 32, for example, resin, may be used.

Figure 3B:
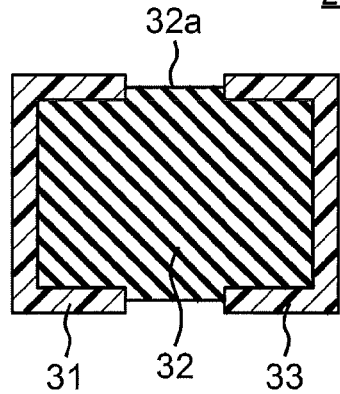
FIG. 3B is a cross-sectional view schematically illustrating the structure of the cushion member of the damper portion of the torque fluctuation absorber according to the first embodiment.
Figure 3C:
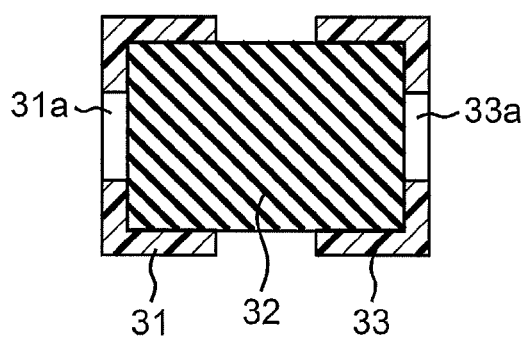
FIG. 3C is a cross-sectional view schematically illustrating the structure of the cushion member of the damper portion of the torque fluctuation absorber according to the first embodiment.
Figure 3D:
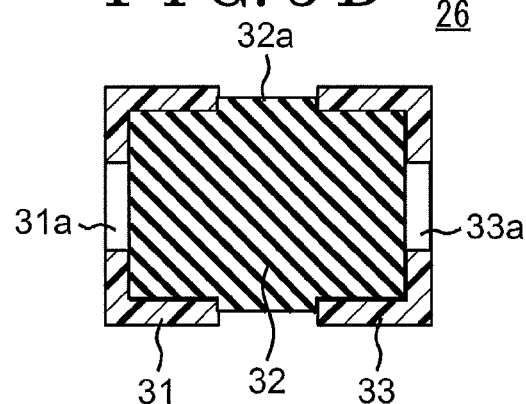
FIG. 3D is a cross-sectional view schematically illustrating the structure of the cushion member of the damper portion of the torque fluctuation absorber according to the first embodiment.
Figure 3E:
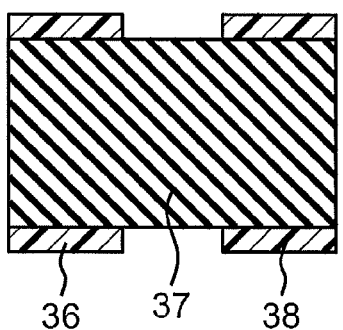
FIG. 3E is a cross-sectional view schematically illustrating the structure of the cushion member of the damper portion of the torque fluctuation absorber according to the first embodiment.
Figure 3F:
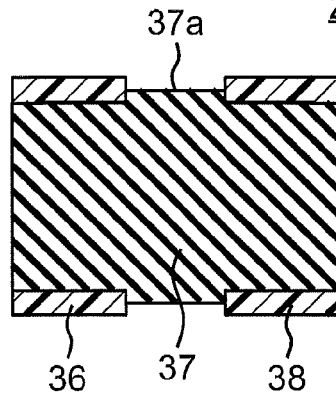
FIG. 3F is a cross-sectional view schematically illustrating the structure of the cushion member of the damper portion of the torque fluctuation absorber according to the first embodiment.

Instead of a structure illustrated in FIG. 3A, the cushion member 26 may include other structures. For example, as illustrated in FIG. 3B, the cushion member 26 includes a protruding portion 32a formed at a longitudinally intermediate portion of the elastic member 32, that is, the portion that is not covered with the abrasion resistant members 31, 33, so as to protrude radially outwardly in a continuous manner along an entire circumference, that is, in a circumferential direction, of the elastic member 32. As illustrated in FIG. 3C, the abrasion resistant member 31 includes a hole 31a formed at a part of a portion of the abrasion resistant member 31, the portion which covers the corresponding end surface of the elastic member 32. Similarly, the abrasion resistant member 33 includes a hole 33a formed at a part of a portion of the abrasion resistant member 33, the portion which covers the corresponding end surface of the elastic member 32. As illustrated in FIG. 3D, the cushion member 26 includes the protruding portion 32a similar to that shown in FIG. 3B and the holes 31a, 33a similar to those shown in FIG. 3C. As illustrated in FIG. 3E, the cushion member 26 is configured in a manner that abrasion resistant members 36, 38 (i.e., the first abrasion resistant member and the second abrasion resistant member, respectively) do not cover end surfaces of an elastic member 37. As illustrated in FIG. 3F, the cushion member 26 is configured in a manner that the abrasion resistant members 36, 38 do not cover the end surfaces of the elastic member 37, and in a manner that a protruding portion 37a formed at a longitudinally intermediate portion of the elastic member 37, that is, the portion that is not covered with the abrasion resistant members 36, 38, so as to protrude radially outwardly in a continuous manner along an entire circumference of the elastic member 37.

Figure 4:
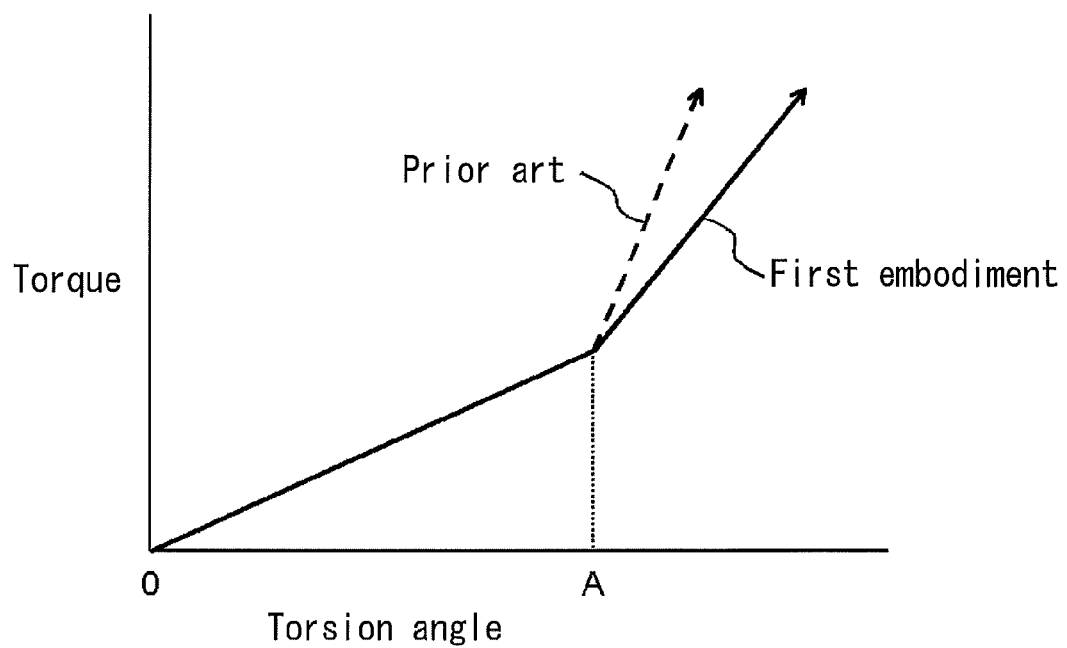
FIG. 4 is a view schematically showing comparison of a torsional characteristic of the damper portion of the torque fluctuation absorber of the first embodiment of this disclosure and that of a known technique.

Next, a torsional characteristic of the damper portion 3 of the torque fluctuation absorber 1 according to the first embodiment will be explained with reference to FIG. 4. In FIG. 4, a hysteresis torque of the hysteresis portion 4 is ignored.

Figure 17:
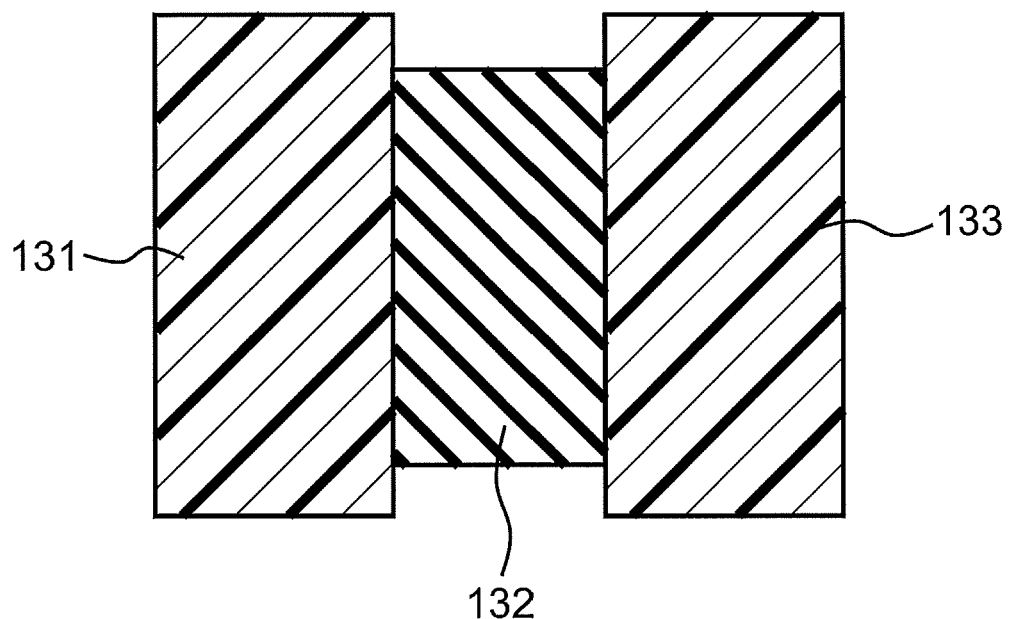
FIG. 17 is a cross-sectional view schematically illustrating a structure of a cushion member of a damper portion of a known torque fluctuation absorber.

When a torsion angle is equal to or greater than 0 and less than A, the coil spring 20 is compressed but the elastic member 32 is not compressed so that the torque fluctuations are absorbed by the elastic force of the coil spring 20 but not by an elastic force of the elastic member 32. When the torsion angle is equal to A, both end portions of the cushion member 26 in the lengthwise direction thereof come in contact with the seat members 21 respectively. When the torsion angle is greater than A, the coil spring 20 and the cushion member 26 are compressed so that the torque fluctuations are absorbed by the elastic force of the coil spring 20 and by the elastic force of the cushion member 26 (the elastic member 32). Here, according to a known cushion member 126 (refer to FIG. 17), any part of an elastic member 132 is not positioned at an inside of abrasion resistant members 131, 133, and thus a stroke of deformation of the elastic member 132 is small, which may cause an abrupt torque fluctuation in response to a change in the torsion angle. On the other hand, according to the cushion member 26 of the first embodiment (refer to FIG. 3A), the part of the elastic member 32 is positioned at an inside, that is, the inner circumference, of the abrasion resistant members 31, 33, and thus a stroke of deformation of the elastic member 32 is greater than that of the known elastic member 132, which brings gradual torque fluctuations in response to the change in the torsion angle.

The damper portion 3 including the above-described cushion member 26 may be applied to a structure having a torsional elasticity, such as a clutch.

According to the first embodiment, because the elastic member 32 of the cushion member 26 is partly positioned at the inner circumference of the abrasion resistant members 31, 33, the part of the elastic member 32 which is positioned at the inner circumference of the abrasion resistant members 31, 33 is also allowed to deform, thereby increasing the stroke of compression of the elastic member 32. As a result, a shock absorbing ability (an energy absorbing ability) at the damper portion 3 increases, which reduces rigidity of the cushion member 26, thereby improving an effect of suppressing torsional vibration. In addition, because the elastic member 32 is partly positioned at the inside of the abrasion resistant members 31, 33, the abrasion resistant members 31, 33 do not need to be adhered to the elastic member 32. As a result, a production cost is reduced and connection strength improves.

The torque fluctuation absorber of a second embodiment will be explained with reference to FIGS. 5A to 6D.

The second embodiment is a variation of the first embodiment and the structure of the cushion member 226 is basically identical to that of the first embodiments. In the second embodiment, a protruding portion and a recessed portion are provided at joint portions of the elastic member 232 and the abrasion resistant members 231, 233 in order to restrict the abrasion resistant members 231, 233 from detaching from the elastic member 232. For example, as illustrated in FIG. 5A, protruding portions 32b, 32c (i.e., first protruding portions) are formed at longitudinally end portions of the outer circumferential surface of the elastic member 232 respectively so as to protrude radially outwardly in a continuous manner along the entire circumference of the elastic member 232. Recessed portions 31b, 33b (i.e., first recessed portions) engaging with the protruding portions 32b, 32c are formed at the abrasion resistant members 231, 233. Other structures in the second embodiment are identical to those in the first embodiment.

The cushion member 226 is manufactured, for example, by inserting the pre-formed elastic member 232 into a metal mold, and then forming the abrasion resistant members 231, 233 in the metal mold so as to be integral with the elastic member 232. According to the above-described manufacturing method, the elastic member 232 fits favorably into the metal mold and is less likely to form burrs, which may avoid the need of a deburring process later. Further, it is difficult to provide a come-off preventive structure at the inside of the abrasion resistant members 231, 233 in a case where the cushion member 226 is manufactured by using an ordinary mold. However, by forming the protruding and recessed portions serving as the come-off preventive structure at the elastic member 232 in advance, the ordinary mold may be used without difficulty.

Figure 6A:
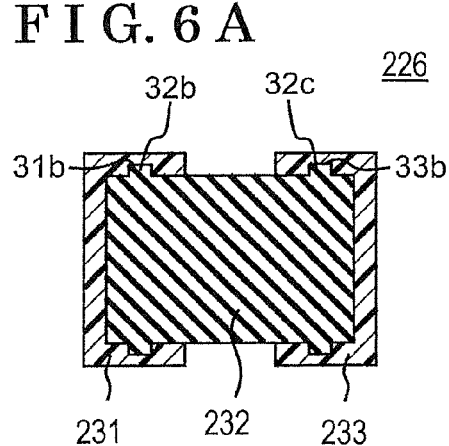
FIG. 6A is a cross-sectional view schematically illustrating the structure of the cushion member of the damper portion of the torque fluctuation absorber according to the second embodiment.
Figure 6B:
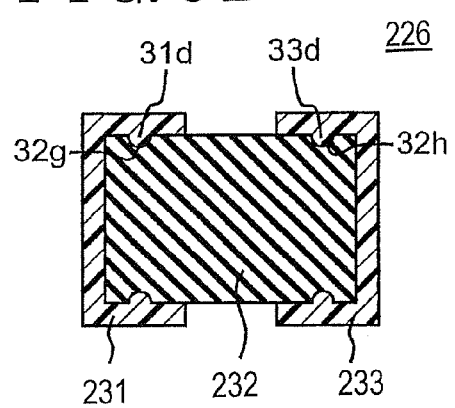
FIG. 6B is a cross-sectional view schematically illustrating the structure of the cushion member of the damper portion of the torque fluctuation absorber according to the second embodiment.
Figure 6C:
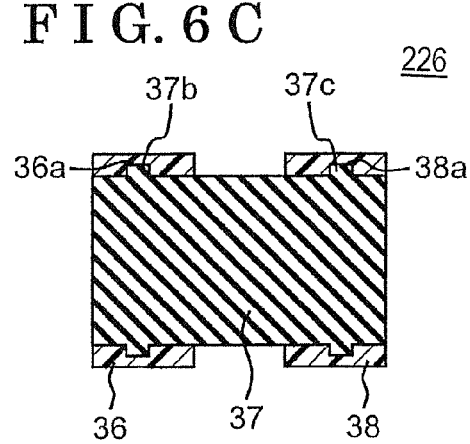
FIG. 6C is a cross-sectional view schematically illustrating the structure of the cushion member of the damper portion of the torque fluctuation absorber according to the second embodiment.
Figure 6D:
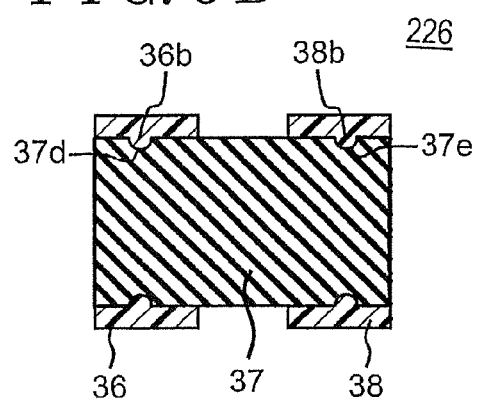
FIG. 6D is a cross-sectional view schematically illustrating the structure of the cushion member of the damper portion of the torque fluctuation absorber according to the second embodiment.

Instead of the structure illustrated in FIG. 5A, the cushion member 226 may include other structures. For example, as illustrated in FIG. 5B, protruding portions 32d, 32e (i.e., the first protruding portions) are formed at the end surfaces of the elastic member 232 respectively, and recessed portions 31c, 33c (i.e., the first recessed portions) engaging with the protruding portions 32d, 32e are formed at the abrasion resistant members 231, 233. As illustrated in FIG. 5C, the cushion member 226 includes the protruding portions 32b, 32c and the recessed portions 31b, 33b that are similar to those shown in FIG. 5A, and the protruding portions 32d, 32e and the recessed portions 31c, 33c that are similar to those shown in FIG. 5B. As illustrated in FIG. 5D, an abrasion resistant member 34, which is positioned between the abrasion resistant members 231, 233 and covers a portion of the outer circumferential surface of the longitudinally intermediate portion of the elastic member 232, is provided at the elastic member 232. In addition, at a joint portion of the elastic member 232 and the abrasion resistant member 34, a protruding portion 32f (i.e., the first protruding portion) is formed at a portion of the outer circumferential surface of the elastic member 232 so as to protrude radially outwardly in a continuous manner along the entire circumference of the elastic member 232, and a recessed portion 34a (i.e., the first recessed portion) engaging with the protruding portion 32f is formed at the abrasion resistant member 34. As illustrated in FIG. 6A, the protruding portions 32b, 32c of the elastic member 232 and the recessed portions 31b, 33b of the abrasion resistant members 231, 233 are positioned away from the longitudinally end portions of the elastic member 232 toward a longitudinal center of the elastic member 232, respectively. As illustrated in FIG. 6B, protruding portions 31d, 33d (i.e., a first protruding portion) are formed at portions of inner circumferential surfaces of the abrasion resistant members 231, 233 so as to protrude radially inwardly in a continuous manner along an entire circumference of the abrasion resistant members 231, 233, and recessed portions 32g, 32h (i.e., the first recessed portions) engaging with the protruding portions 31d, 33d are formed at the elastic member 232. As illustrated in FIG. 6C, the abrasion resistant members 36, 38 do not cover the end surfaces of the elastic member 37, while protruding portions 37b, 37c (i.e., the first protruding portions) are formed at the elastic member 37 and recessed portions 36a, 38a (i.e., the first recessed portions) engaging with the protruding portions 37b, 37c are formed at the abrasion resistant members 36, 38. As illustrated in FIG. 6D, the abrasion resistant members 36, 38 do not cover the end surfaces of the elastic member 37, while protruding portions 36b, 38b (i.e., the first protruding portions) are formed at the abrasion resistant members 36, 38 and recessed portions 37d, 37e (i.e., the first recessed portions) engaging with the protruding portions 36b, 38b are formed at the elastic member 37.

According to the second embodiment, similar effects and advantages to those of the first embodiment are obtained. In addition, because the protruding portion and the recessed portion are provided at the joint portions of the elastic member 232, 37 and the abrasion resistant members 231, 233, 36, 38, it is restricted that the abrasion resistant members 231, 233, 36, 38 come off or detach from the elastic member 232, 37. As a result, the connection strength between the elastic member 232, 37 and the abrasion resistant members 231, 233, 36, 38 improves.

Figure 7A:
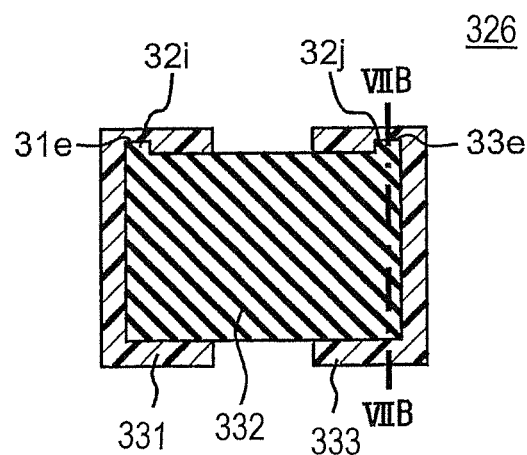
FIG. 7A is a cross-sectional view perpendicular to a direction of expansion and compression of a cushion member, which schematically illustrates a structure of the cushion member of a damper portion of a torque fluctuation absorber according to a third embodiment disclosed here.
Figure 7B:
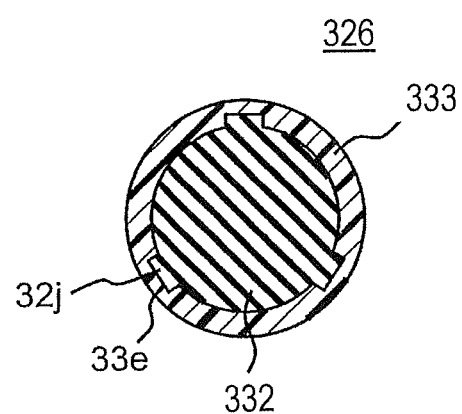
FIG. 7B is a cross-sectional view which is taken along line VIIB-VIIB in FIG. 7A.

The torque fluctuation absorber of a third embodiment will be explained with reference to FIGS. 7A and 7B.

The third embodiment is a variation of the first embodiment and the structure of the cushion member 326 is basically identical to that of the first embodiment. In the third embodiment, protruding portions 32i, 32j (i.e., the first protruding portions) are formed at the outer circumferential surface of the elastic member 332 so as to protrude radially outwardly in a discontinuous manner in a circumferential direction of the elastic member 332, more specifically, the joint portion of the elastic member 332 and the abrasion resistant members 331, 333 (in other words, the protruding portions 32i, 32j are formed circumferentially partly or discontinuously, but not entirely, around the outer circumferential surface of the elastic member 332) in order to restrict the abrasion resistant members 331, 333 from detaching from the elastic member 332. Recessed portions 31e, 33e (i.e., the first recessed portions) engaging with the protruding portions 32i, 32j are formed at the abrasion resistant members 331, 333. Other structures in the third embodiment are identical to those in the first embodiment. An inverse relation is applicable between the protruding and the recessed portions formed at the joint portion of the elastic member 332 and the abrasion resistant members 331, 333, that is, the protruding portions may be formed at the abrasion resistant members 331, 333 and the recessed portions may be formed at the elastic member 332.

According to the third embodiment, similar effects and advantages to those of the first embodiment are obtained. In addition, because the protruding portions and the recessed portions of the cushion member 326 are formed at the joint portions of the elastic member 332 and the abrasion resistant members 331, 333 circumferentially partly, it is restricted that the abrasion resistant members 331, 333 detach from the elastic member 332. As a result, the connection strength between the elastic member 332 and the abrasion resistant members 331, 333 improves. In addition, a relative positional offset between the elastic member 332 and the abrasion resistant members 331, 333 in a rotational direction is restricted, thereby increasing durability of the cushion member 326.

Figure 8:
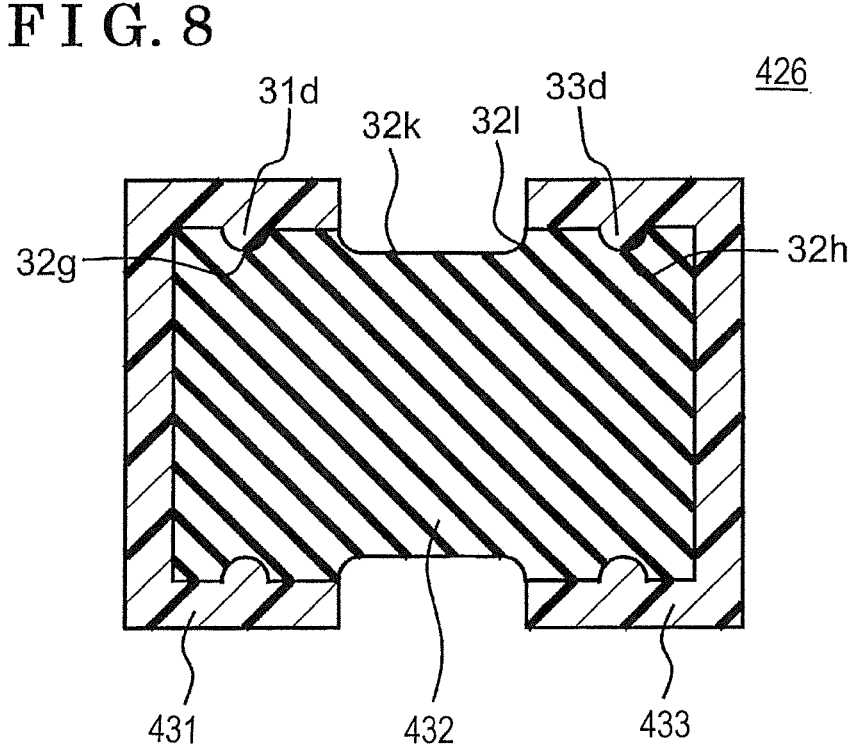
FIG. 8 is a cross-sectional view schematically illustrating a structure of a cushion member of a damper portion of a torque fluctuation absorber according to a fourth embodiment disclosed here.

The torque fluctuation absorber of a fourth embodiment will be explained with reference to FIG. 8.

The fourth embodiment is a variation of the first embodiment and the structure of the cushion member 426 is basically identical to that of the first embodiment. In the fourth embodiment, a recessed portion 32k (i.e., a second recessed portion) is formed at a longitudinally intermediate portion of the elastic member 432, that is, the portion which is positioned between the abrasion resistant members 431, 433 and is not covered with the abrasion resistant members 431, 433, so that the outer circumferential surface of the longitudinally intermediate portion of the elastic member 432 is recessed radially inwardly in a continuous manner along the entire circumference of the elastic member 432. A corner radius portion 32l is provided at each of corner portions formed between a bottom surface of the recessed portion 32k and side wall surfaces of the recessed portion 32k which are positioned in a vicinity of the abrasion resistant member 431, 433 for providing roundness at the corner portions. In addition, according to the fourth embodiment, the protruding portions and the recessed portions (for example, the protruding portions 31d, 33d and the recessed portions 32g, 32h, the other configurations of the second, or the third embodiment may be applicable) are formed at the joint portion of the elastic member 432 and the abrasion resistant members 431, 433 in a similar manner to that explained in the second embodiment as illustrated in FIG. 6B. Other structures in the fourth embodiment are identical to those in the first embodiment.

According to the fourth embodiment, similar effects and advantages to those of the first embodiment are obtained. In addition, because the recessed portion 32k is formed at the longitudinally intermediate portion of the elastic member 432, abrasion is prevented from occurring at a contact portion between the elastic member 432 and the abrasion resistant members 431, 433, and a load applied to the abrasion resistant members 431, 433 in a state where the elastic member 432 is compressed is reduced. Thus, the abrasion resistant members 431, 433 may be formed to be thinner. Further, because the corner radius portion 32l is formed at the corner portions between the bottom surface of the recessed portion 32k and the side wall surfaces of the recessed portion 32k which are positioned in a vicinity of the abrasion resistant members 431, 433 for providing the roundness at the corner portions, durability of the elastic member 432 increases.

The torque fluctuation absorber of a fifth embodiment will be explained with reference to FIG. 9.

The fifth embodiment is a variation of the first embodiment and the structure of the cushion member 526 is basically identical to that of the first embodiment. In the fifth embodiment, the elastic member 532 includes holes 32m, 32n each formed into a closed-end hole and provided at the end surfaces of the elastic member 532 (a through hole may also apply). Further, in the fifth embodiment, in a similar manner to that explained in the first embodiment as illustrated in FIG. 3C, the abrasion resistant member 531 includes the hole 31a formed at the part of the portion of the abrasion resistant member 531, that is, the portion covering the corresponding end surface of the elastic member 532. The abrasion resistant member 533 includes the hole 33a formed at the part of the portion of the abrasion resistant member 533, that is, the portion covering the corresponding end surface of the elastic member 532. Still further, in the fifth embodiment, the protruding portions and the recessed portions (for example, the protruding portions 32b, 32c and the recessed portions 31b, 33b, or the other configurations of the second or third embodiment may be applicable) are formed at the joint portion of the elastic member 532 and the abrasion resistant members 531, 533 in a similar manner to that explained in the second embodiment as illustrated in FIG. 5A. Other structures in the fifth embodiment are identical to those in the first embodiment.

According to the fifth embodiment, similar effects and advantages to those of the first and second embodiments are obtained. In addition, because the holes 32m, 32n are formed at the end surfaces of the elastic member 532, the elastic member 532 is restricted from inappropriately expanding in a compressed state, thereby preventing the elastic member 532 from interfering with the abrasion resistant members 531, 533 positioned at the outer circumferential surface of the elastic member 532. In addition, the above-described structure allows the elastic member 532 to deform inward and outward in a radial direction thereof, and thus a stress is reduced and the durability of the cushion member 526 improves. As a result, the load applied to the abrasion resistant members 531, 533 is reduced, thereby increasing strength of the cushion member 526.

Figure 10A:
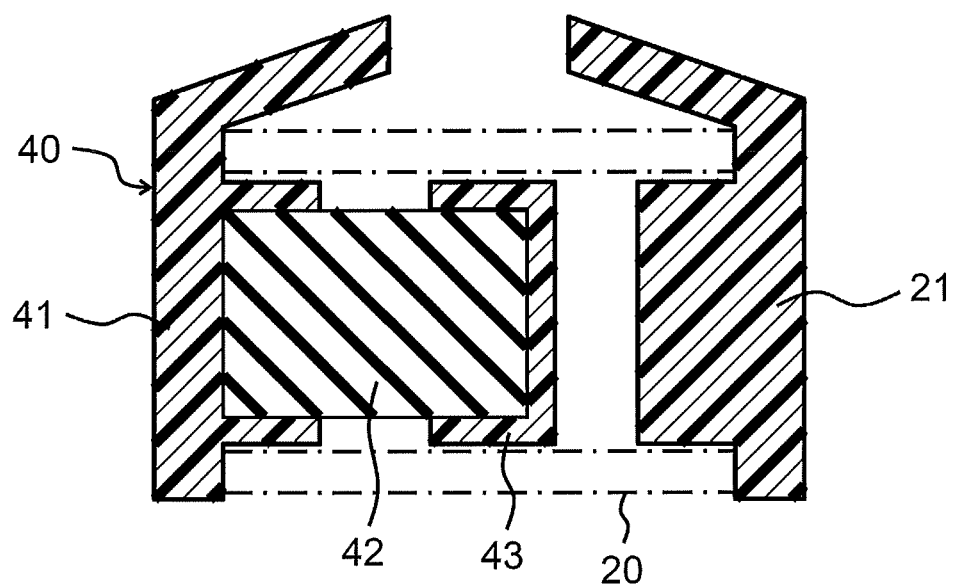
FIG. 10A is a cross-sectional view schematically illustrating a structure of a seat member of a damper portion of a torque fluctuation absorber according to a sixth embodiment disclosed here.

The torque fluctuation absorber of a sixth embodiment will be explained with reference to FIGS. 10A and 10B.

According to the sixth embodiment, which is a variation of the first embodiment, the cushion member 26 of the first embodiment (refer to FIG. 3A) and the seat member 21 of the first embodiment (refer to FIG. 1) are integrally formed with each other (that is, one of the abrasion resistant members of the cushion member is integrally formed into the seat member) to form a seat member 40 including a cushion. An abrasion resistant member 43 is provided at one end of an elastic member 42 and a seat portion 41 receiving one end of the coil spring 20 is provided at the other end of the elastic member 42. The abrasion resistant member 43 and the seat portion 41 cover an outer circumferential surface of the elastic member 42 in a discontinuous manner (that is, partly) and cover end surfaces of the elastic member 42. The seat member 40 including the cushion may be applied in combination with the seat member 21 which does not include the cushion as illustrated in FIG. 10A, or in combination with another seat member 40 including the cushion as illustrated in FIG. 10B. The protruding portions and the recessed portions that are similar to those of the second or the third embodiment may be provided at a joint portion of the elastic member 42 and the abrasion resistant member 43 or at a joint portion of the elastic member 42 and the seat portion 41. The recessed portion formed at the longitudinally intermediate portion of the elastic member or the corner radius portion, which are similar to those of the fourth embodiment (refer to FIG. 8), may also be provided at the elastic member 42. The recessed portion, that is, the closed-end holes (or the through hole), formed at the end surfaces of the elastic member similar to those of the fifth embodiment (refer to FIG. 9) may also be formed at the end surfaces of the elastic member 42.

According to the sixth embodiment, similar effects and advantages to those of the first embodiment are obtained. In addition, because the seat member 40 includes the cushion, costs and the number of components are reduced. Further, in a case where two of the seat members 40 each including the cushion are used, the seat members 40 may be accommodated in the inside of the coil spring 20, or alternatively, the seat members 40 each including the cushion may be used without the coil spring 20. In a case where the seat member 40 including the cushion is used in combination with the seat member 21 which does not include the cushion as illustrated in FIG. 10A, the seat member 40 including the cushion serves as a guide of the coil spring 20.

Figure 11A:
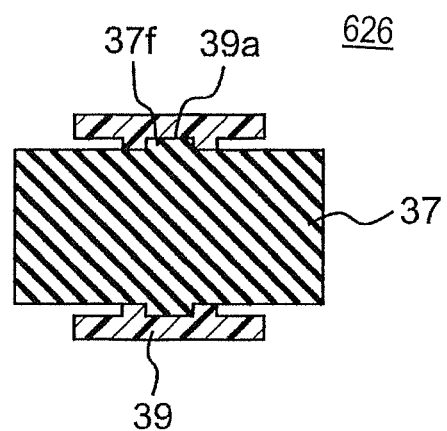
FIG. 11A is a cross-sectional view schematically illustrating a structure of a cushion member of a damper portion of a torque fluctuation absorber according to a seventh embodiment disclosed here.
Figure 11B:
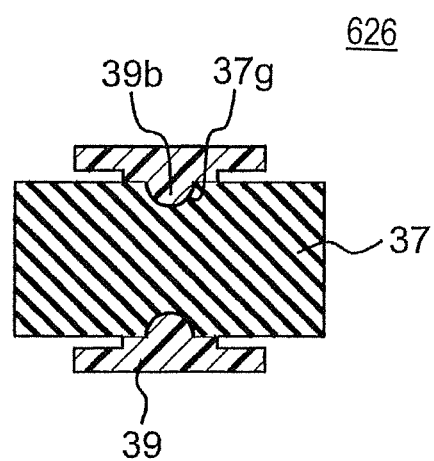
FIG. 11B is a cross-sectional view schematically illustrating the structure of the cushion member of the damper portion of the torque fluctuation absorber according to the seventh embodiment.

The torque fluctuation absorber of a seventh embodiment will be explained with reference to FIGS. 11A and 11B.

According to the seventh embodiment, which is a variation of the first embodiment, an abrasion resistant member 39 is provided so as to cover a longitudinally intermediate portion of an outer circumferential surface of the elastic member 37 of the cushion member 626, instead of being formed at the end surfaces of the elastic member 37. Each of the end surfaces of the elastic member 37 is in and out of contact with the seat members 21 (refer to FIG. 1) facing the respective end surface of the elastic member 37. Further, a protruding portion and a recessed portion are provided at a joint portion of the elastic member 37 and the abrasion resistant member 39 in order to restrict the abrasion resistant member 39 from detaching from the elastic member 37. For example, as illustrated in FIG. 11A, a protruding portion 37f (i.e., the first protruding portion) is formed at the longitudinally intermediate portion of the outer circumferential surface of the elastic member 37 so as to protrude radially outwardly in a continuous manner along an entire circumference of the elastic member 37, and a recessed portion 39a (i.e., the first recessed portion) engaging with the protruding portion 37f is formed at the abrasion resistant member 39. As illustrated in FIG. 11B, a protruding portion 39b (i.e., the first protruding portion) is formed at the abrasion resistant member 39 and a recessed portion 37g (i.e., the first recessed portion) engaging with the protruding portion 39b is formed at the elastic member 37. The recessed portion and the protruding portion formed at the joint portion of the elastic member 37 and the abrasion resistant member 39 may include the configurations of the second or third embodiment. Other structures in the seventh embodiment are identical to those in the first embodiment.

According to the seventh embodiment, similar effects and advantages to those of the first embodiment are obtained. In addition, because the abrasion resistant member 39 is formed at the longitudinally intermediate portion of the outer circumferential surface of the elastic member 37, the cushion member 626 includes a single abrasion resistant member, that is, the abrasion resistant member 39, and thus a cost for molding is reduced. In addition, a length of the abrasion resistant member 39 in the longitudinal direction thereof may be set to be long, as a result, it is restricted that the elastic member 37 is stuck between coil wires of the coil spring 20 (refer to FIG. 1).

The torque fluctuation absorber of an eighth embodiment will be explained with reference to FIG. 12.

The eighth embodiment is a variation of the first embodiment and the structure of the cushion member 726 is basically identical to that of the first embodiment. In the eighth embodiment, the cushion member 726 includes holes 31f, 33f penetrating a part of the portion of each of the abrasion resistant members 731, 733, the portion which cover the end surfaces of the elastic member 732. The cushion member 726 also includes protruding portions 32o, 32p (i.e., a second protruding portion) formed at the end surfaces, that is, a portion of each end surface, of the elastic member 732 to protrude beyond the abrasion resistant members 731, 733 through the holes 31f, 33f, respectively. The cushion member 726 is configured so that each of the protruding portions 32o, 32p comes in and out of contact with the respective seat member 21 (refer to FIG. 1). In the eighth embodiment, the protruding portions and the recessed portions (for example, the protruding portions 32b, 32c and the recessed portions 31b, 33b, the other configurations of the second embodiment, or the third embodiment may be applicable) are formed at the joint portion of the elastic member 732 and the abrasion resistant members 731, 733 in a similar manner to that explained in the second embodiment as illustrated in FIG. 5A. Other structures in the eighth embodiment are identical to those in the first embodiment. In addition, the recessed portion formed at the longitudinally intermediate portion of the elastic member or the corner radius portion, which are similar to those of the fourth embodiment (refer to FIG. 8) may also be provided at the elastic member 732.

According to the eighth embodiment, similar effects and advantages to those of the first embodiment are obtained. In addition, because the protruding portions 32o, 32p protruding from the abrasion resistant members 731, 733 through the holes 31f, 33f are formed at the end surfaces of the elastic member 732, an overall length of the elastic member 732 in the longitudinal direction thereof may be set to be long. As a result, the amount of stroke of compression of the elastic member 732 increases, and thus even greater impact torque is reduced. Further, while the elastic member 732 is being compressed, the protruding portions 32o, 32p is compressed first, and then a body portion of the elastic member 732 comes to be compressed, and thus the torque is reduced gradually.

Figure 13A:
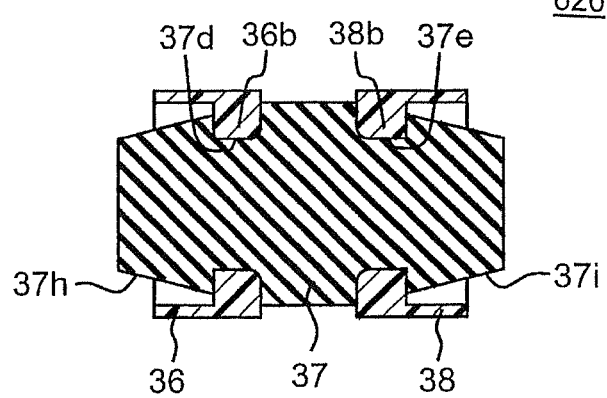
FIG. 13A is a cross-sectional view schematically illustrating a structure of a cushion member of a damper portion of a torque fluctuation absorber according to a ninth embodiment disclosed here.
Figure 13B:
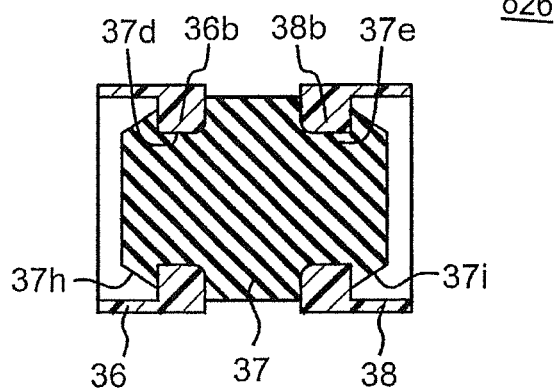
FIG. 13B is a cross-sectional view schematically illustrating the structure of the cushion member of the damper portion of the torque fluctuation absorber according to the ninth embodiment.
Figure 13C:
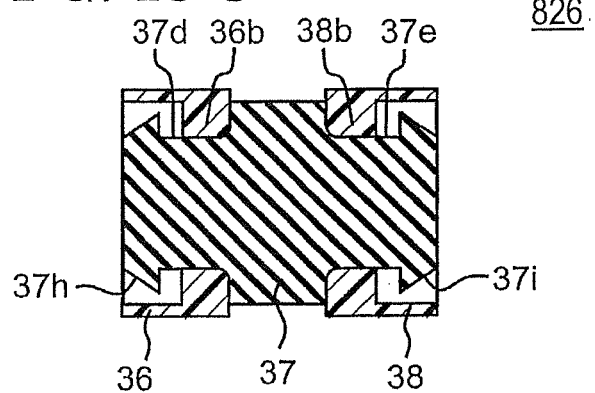
FIG. 13C is a cross-sectional view schematically illustrating the structure of the cushion member of the damper portion of the torque fluctuation absorber according to the ninth embodiment.

The torque fluctuation absorber of a ninth embodiment will be explained with reference to FIGS. 13A to 13C.

The ninth embodiment is a variation of the first embodiment and the structure of the cushion member 826 is basically identical to that of the first embodiment. In the ninth embodiment, the elastic member 37 and the abrasion resistant members 36, 38 are pre-formed to be engageable with each other, and the abrasion resistant members 36, 38 are engaged in, or fitted to, end portions of the elastic member 37 respectively so as to be integrated with the elastic member 37. For example, conic surfaces 37h, 37i are provided at the end portions of the outer circumferential surface of the elastic member 37, respectively. At the outer circumferential surface of the elastic member 37, the recessed portions 37d, 37e are formed in a manner that each of the recessed portions 37d, 37e is recessed radially inwardly along an entire circumference of the elastic member 37. The recessed portions 37d, 37e are positioned adjacent to the conic surfaces 37h, 37i respectively and positioned between the conic surfaces 37h, 37i and a longitudinally central portion of the elastic member 37. The protruding portions 36b, 38b engaging with the recessed portions 37d, 37e are formed at an inner circumference of the abrasion resistant members 36, 38 each formed into a hollow cylindrical shape. The end portions of the elastic member 37, that is, the conic surfaces 37h, 37i, may be configured to protrude from the abrasion resistant members 36, 38 as illustrated in FIG. 13A, or may be configured to be recessed from the abrasion resistant members 36, 38 as illustrated in FIG. 13B. The recessed portions 37d, 37e may be formed so that a clearance is provided between the recessed portions 37d, 37e and the protruding portions 36b, 38b respectively in a compression direction of the elastic member 37 as illustrated in FIG. 13C. Other structures in the ninth embodiment are identical to those in the first embodiment.

According to the ninth embodiment, similar effects and advantages to those of the first embodiment are obtained. In addition, because the elastic member 37 and the abrasion resistant members 36, 38 are formed to be engageable with each other, adhering of the abrasion resistant members 36, 38 to the elastic member 37, which may be costly, is eliminated, which facilitates ease of production.

The torque fluctuation absorber of a tenth embodiment will be explained with reference to FIGS. 14A and 14B. FIG. 14B is a plan view seen from a direction of an arrow Y in FIG. 14A.

Figure 14A:
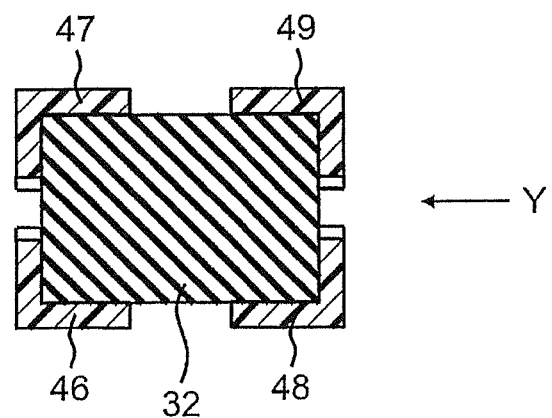
FIG. 14A is a cross-sectional view perpendicular to a direction of expansion and compression of a cushion member, which schematically illustrates a structure of the cushion member of a damper portion of a torque fluctuation absorber according to a tenth embodiment disclosed here.
Figure 14B:
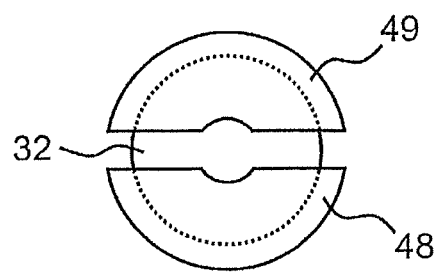
FIG. 14B is a plan view seen from a direction of an arrow in FIG. 14A.

According to the tenth embodiment, which is a variation of the first embodiment, the abrasion resistant members 31, 33 (refer to FIG. 3A) are divided into, that is, include plural abrasion resistant members 46, 47, 48, 49, for example, each of the abrasion resistant members 31, 33 includes two abrasion resistant members as illustrated in FIGS. 14A and 14B. Other structures in the tenth embodiment are identical to those in the first embodiment. According to the tenth embodiment, similar effects and advantages to those of the first embodiment are obtained.

The torque fluctuation absorber of an eleventh embodiment will be explained with reference to FIG. 15.

Figure 10B:
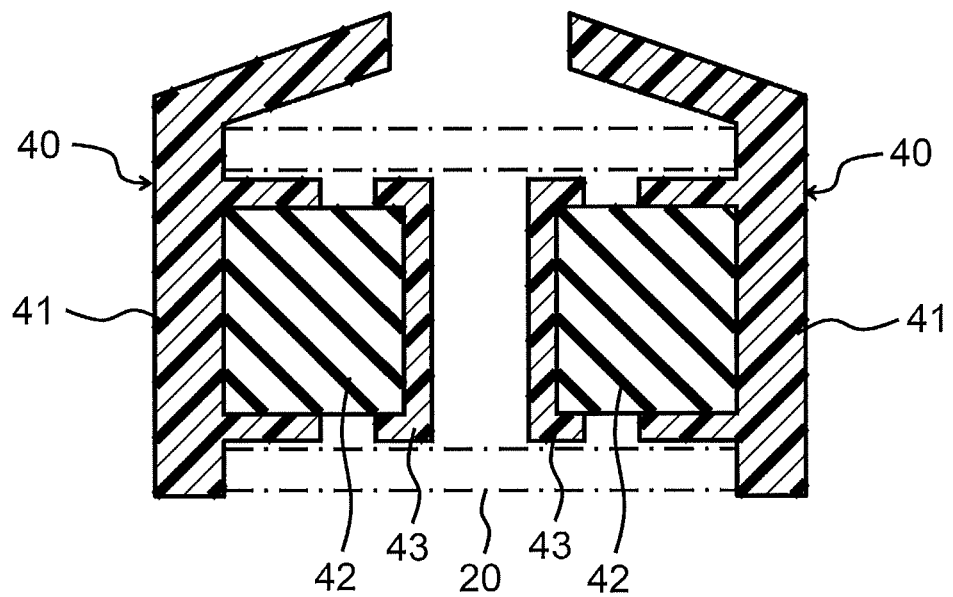
FIG. 10B is a cross-sectional view schematically illustrating the structure of the seat member of the damper portion of the torque fluctuation absorber according to the sixth embodiment.

According to the eleventh embodiment, which is a variation of the sixth embodiment, the abrasion resistant member 43 illustrated in FIG. 10B (or FIG. 10A) is not applied. In other words, in the eleventh embodiment, the abrasion resistant member 31 (refer to FIG. 3A) of the cushion member 26 (refer to FIG. 3A) and the corresponding seat member 21 (refer to FIG. 1) are integrally formed with each other, and the abrasion resistant member 33 (refer to FIG. 3A) and the corresponding seat member 21 (refer to FIG. 1) are integrally formed with each other, that is, the abrasion resistant members provided at both sides of the cushion member are integrally formed into the seat members. At the same time, in the eleventh embodiment, the elastic members 42 that are defined by dividing the elastic member 32 (refer to FIG. 3A) into two members are used for the seat member 40 which includes therein the cushion. That is, the elastic member 42 includes the two members. Other structures in the eleventh embodiment are identical to those in the sixth embodiment. According to the eleventh embodiment, similar effects and advantages to those of the sixth embodiment are obtained.

Figure 16:
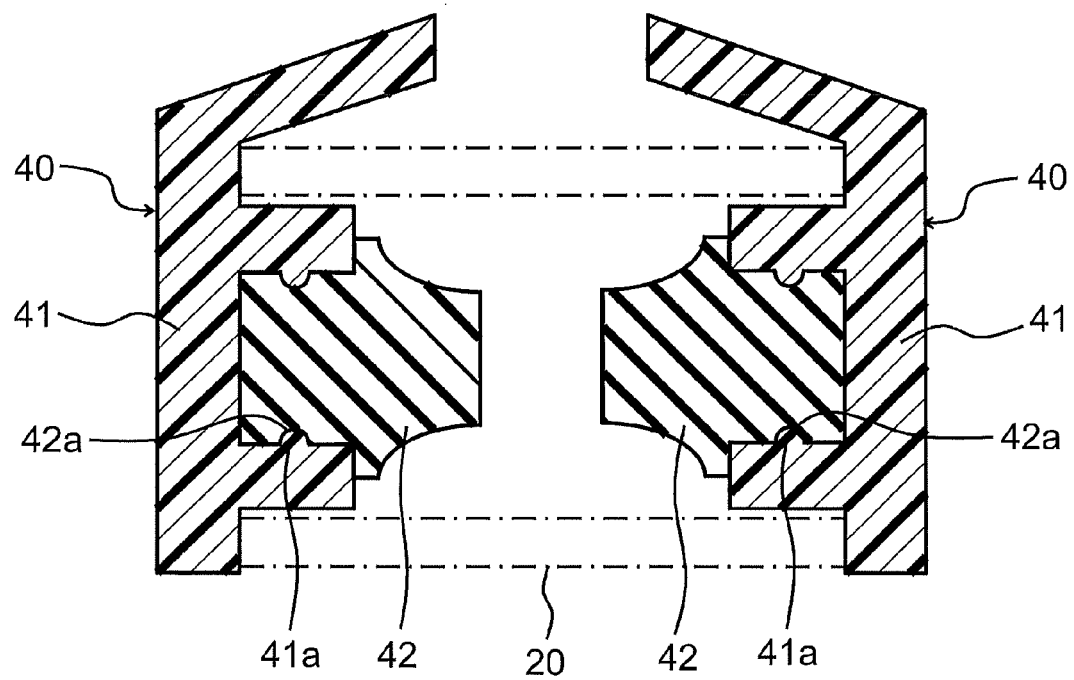
FIG. 16 is a cross-sectional view schematically illustrating a structure of a cushion member of a damper portion of a torque fluctuation absorber according to a twelfth embodiment disclosed here.

The torque fluctuation absorber of a twelfth embodiment will be explained with reference to FIG. 16.

The twelfth embodiment is a variation of the eleventh embodiment and the structure of the seat member 40 is basically identical to that of the eleventh embodiment. In the twelfth embodiment, a protruding portion and a recessed portion are formed at a joint portion of the seat portion 41 and the elastic member 42 in order to restrict the elastic member 42 from detaching from the seat portion 41. For example, as illustrated in FIG. 16, a recessed portion 42a is formed at an outer circumferential surface of the elastic member 42 so as to recess radially inwardly in a continuous manner (or in a discontinuous manner) along the entire circumference of the elastic member 42, and a protruding portion 41a engaging with the recessed portion 42a is formed at the seat portion 41. In addition, the elastic member 42 is formed so that a radial dimension thereof gradually decreases with a distance from a mounting surface at which the elastic member 42 is mounted on the seat portion 41. Other structures in the twelfth embodiment are identical to those in the eleventh embodiment.

According to the twelfth embodiment, similar effects and advantages to those of the eleventh embodiment are obtained. In addition, the elastic member 42 is restricted from detaching from the seat portion 41. Further, by setting the radial dimension of the elastic member 42 to be greater in a vicinity of the mounting surface at which the elastic member 42 is mounted on the seat portion 41 than in a portion away from the mounting surface, an amount of deformation of the elastic member 42 is reduced in the vicinity of the mounting surface and is increased in the portion away from the mounting surface.

Variations and changes may be made to the aforementioned embodiments or forms of application within a scope of the entire disclosure (including the scope of the claims and the drawings) and on the basis of the technical idea of the entire disclosure. Further, various combinations and selection of the components disclosed above may be made within the scope of the claims of this disclosure. That is, this disclosure is intended to cover various modifications and equivalent arrangements that those skilled in the art will appreciate within the spirit and scope of the appended claims, the drawings, the technical idea.

According to the above-described embodiments, the torque fluctuation absorber 1 includes the first and second side plates 17, 18 arranged to be rotatable, the hub member 25 arranged in the rotatable manner relative to the first and second side plates 17, 18, the coil spring 20 for buffering the torsion between the first and second side plates 17, 18 and the hub member 25 by means of the elastic force, and the cushion member 26 arranged at the inside of the coil spring 20 and buffering the torsion between the first and second side plates 17, 18 and the hub member 25 by means of the elastic force, wherein the cushion member 26 includes the elastic member 32, 37, 42 formed in the columnar shape, and the abrasion resistant member 31, 33, 34, 36, 38, 39, 43, 46, 47, 48, 49 partly covering the side surface of the elastic member 32, 37, 42 and including the greater abrasion resistance than the abrasion resistance of the elastic member 32, 37, 42.

According to the above-described structure, because the elastic member 32, 37, 42 of the cushion member 26 is partly positioned at the inner circumference of the abrasion resistant members 31, 33, 34, 36, 38, 39, 43, 46, 47, 48, 49, the part of the elastic member 32, 37, 42 which is positioned at the inner circumference of the abrasion resistant members 31, 33, 34, 36, 38, 39, 43, 46, 47, 48, 49 is also allowed to deform, thereby increasing the stroke of compression of the elastic member 32, 37, 42. As a result, the shock absorbing ability (the energy absorbing ability) at the damper portion 3 increases, which reduces the rigidity of the cushion member 26, thereby improving the effect of suppressing the torsional vibration. In addition, because the elastic member 32, 37, 42 is partly positioned also at the inside of the abrasion resistant members 31, 33, 34, 36, 38, 39, 43, 46, 47, 48, 49, the abrasion resistant member 31, 33, 34, 36, 38, 39, 43, 46, 47, 48, 49 does not need to be adhered to the elastic member 32, 37, 42. As a result, the production cost is reduced and the connection strength improves.

According to the above-described embodiments, the elastic member 32, 37, 42 is made of the rubber or the elastomer resin and the abrasion resistant member 31, 33, 34, 36, 38, 39, 43, 46, 47, 48, 49 is made of the resin including the greater abrasion resistance than the rubber or the elastomer resin of the elastic member 32, 37, 42.

According to the above-described embodiments, one of the elastic member 32, 37 and the abrasion resistant member 31, 33, 34, 36, 38, 39 includes the protruding portion 31d, 32b, 32c, 32d, 32e, 32f, 32i, 32j, 33d, 36b, 37b, 37c, 37f, 38b, 39b at the joint portion of the elastic member 32, 37 and the abrasion resistant member 31, 33, 34, 36, 38, 39, and the other one of the elastic member 32, 37 and the abrasion resistant member 31, 33, 34, 36, 38, 39 includes the recessed portion 31b, 31c, 31e, 32g, 32h, 33b, 33c, 33e, 34a, 36a, 37d, 37e, 37g, 38a, 39a at the joint portion of the elastic member 32, 37 and the abrasion resistant member 31, 33, 34, 36, 38, 39.

According to the above-described embodiments, the protruding portion 31d, 32b, 32c, 32d, 32e, 32f, 33d, 36b, 37b, 37c, 37f, 38b, 39b and the recessed portion 31b, 31c, 32g, 32h, 33b, 33c, 34a, 36a, 37d, 37e, 37g, 38a, 39a are formed continuously along the entire circumference of the joint portion of the elastic member 32, 37 and the abrasion resistant member 31, 33, 34, 36, 38, 39.

According to the above-described embodiments, the protruding portion 32i, 32j and the recessed portion 31e, 33e are formed discontinuously in the circumferential direction of the joint portion of the elastic member 32 and the abrasion resistant member 31, 33.

According to the above-described embodiments, the abrasion resistant member 31, 33, 36, 38, 39, 43, 46, 47, 48, 49 includes the abrasion resistant member 31, 36 provided at the first end of the elastic member 32, 37 and the abrasion resistant member 33, 38 provided at the second end of the elastic member 32, 37 while being apart from the abrasion resistant member 31, 36.

According to the above-described embodiments, the elastic member 32 includes the recessed portion 32k formed at the outer circumferential surface of the intermediate portion between the abrasion resistant member 31, 36 and the abrasion resistant member 33, 38, and the recessed portion 32k is recessed inwardly continuously along the entire circumference of the elastic member 32.

According to the above-described embodiments, the elastic member 32 includes the corner radius portion 32l formed at the corner portions between the bottom surface of the recessed portion 32k and the side wall surfaces of the recessed portion 32k which are positioned in a vicinity of the abrasion resistant member 31, 36 and the abrasion resistant member 33, 38 for providing the roundness at the corner portions.

According to the above-described embodiments, the elastic member 32 includes the protruding portion 32o, 32p protruding from the portion of the end surface of the elastic member 32 beyond the abrasion resistant members 31, 33.

According to the above-described embodiments, one of the abrasion resistant member 31, 36 and the abrasion resistant member 33, 38 includes plural abrasion resistant members 46, 47 or by plural abrasion resistant members 48, 49. Alternatively, both of the abrasion resistant member 31, 36 and the abrasion resistant member 33, 38 include plural abrasion resistant members 46, 47, 48, 49.

According to the above-described embodiments, the torque fluctuation absorber further includes the seat member 40 arranged between the coil spring 20, and the first and second side plates 17, 18 and the hub member 25, wherein the abrasion resistant member 31 or the abrasion resistant member 33 is integrally formed into the seat member 40.

According to the above-described embodiments, the torque fluctuation absorber 1 further includes the seat member 40 arranged between the coil spring 20, and the first and second side plates 17, 18 and the hub member 25, wherein the abrasion resistant member 31 and the abrasion resistant member 33 are integrally formed into the seat member 40, and the elastic member 42 includes two members.

According to the above-described embodiments, the elastic member 32 includes the hole 32m, 32n formed into the closed-end configuration or into the through hole.

According to the above-described embodiments, the abrasion resistant member 39 covers the intermediate portion of the elastic member 37.

According to the above-described embodiments, the cushion member 26 is manufactured by inserting the elastic member 32, 37, 42, which is pre-formed, into the metal mold and by forming the abrasion resistant member 31, 33, 36, 38, 39, 43, 46, 47, 48, 49 in a manner that the abrasion resistant member 31, 33, 36, 38, 39, 43, 46, 47, 48, 49 is integrally formed into the elastic member 32, 37, 42.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
a first rotating member arranged to be rotatable;
a second rotating member arranged in a rotatable manner relative to the first rotating member;
a coil spring for buffering a torsion between the first rotating member and the second rotating member by means of an elastic force; and
a cushion member arranged at an inside of the coil spring and buffering the torsion between the first rotating member and the second rotating member by means of an elastic force, wherein
the cushion member includes an elastic member formed in a columnar shape, and an abrasion resistant member partly covering a side surface of the elastic member and including a greater abrasion resistance than an abrasion resistance of the elastic member,
the abrasion resistant member includes a first abrasion resistant member provided at a first end of the elastic member and a second abrasion resistant member provided at a second end of the elastic member while being apart from the first abrasion resistant member, and
the elastic member includes a first recessed portion formed at an outer circumferential surface of an intermediate portion between the first abrasion resistant member and the second abrasion resistant member and the first recessed portion is recessed inwardly continuously along the entire circumference of the elastic member.

2. The torque fluctuation absorber according to claim 1, wherein
the elastic member is made of rubber or elastomer resin and the first and second abrasion resistant members are made of resin including a greater abrasion resistance than the rubber or the elastomer resin of the elastic member.

3. The torque fluctuation absorber according to claim 1, wherein
one of the elastic member and the first or second abrasion resistant member includes a protruding portion at a joint portion of the elastic member and the first or second abrasion resistant member and
the other one of the elastic member and the first or second abrasion resistant member includes a second recessed portion at the joint portion of the elastic member and the first or second abrasion resistant member.

4. The torque fluctuation absorber according to claim 3, wherein the protruding portion and the second recessed portion are formed continuously along an entire circumference of the joint portion of the elastic member and the first or second abrasion resistant member.

5. The torque fluctuation absorber according to claim 3, wherein the protruding portion and the second recessed portion are formed discontinuously in a circumferential direction of the joint portion of the elastic member and the first or second abrasion resistant member.

6. The torque fluctuation absorber according to claim 1, wherein the elastic member includes a corner radius portion formed at corner portions between a bottom surface of the first recessed portion and side wall surfaces of the first recessed portion which are positioned in a vicinity of the first abrasion resistant member and the second abrasion resistant member for providing roundness at the corner portions.

7. The torque fluctuation absorber according to claim 1, wherein one or both of the first abrasion resistant member and the second abrasion resistant member include a plurality of abrasion resistant members.

8. The torque fluctuation absorber according to claim 1, further comprising:

a seat member arranged between the coil spring, and the first rotating member and the second rotating member, wherein the first abrasion resistant member or the second abrasion resistant member is integrally formed into the seat member.

9. The torque fluctuation absorber according to claim 1, further comprising:

a seat member arranged between the coil spring, and the first rotating member and the second rotating member, wherein the first abrasion resistant member and the second abrasion resistant member are integrally formed into the seat member, and the elastic member includes two members.

10. The torque fluctuation absorber according to claim 1, wherein the elastic member includes a hole.

11. The torque fluctuation absorber according to claim 10, wherein the hole is formed into a closed-end configuration.

12. The torque fluctuation absorber according to claim 1, wherein the abrasion resistant member covers an intermediate portion of the elastic member.

13. The torque fluctuation absorber according to claim 1, wherein the cushion member is manufactured by inserting the elastic member, which is pre-formed, into a metal mold and by forming the abrasion resistant member in a manner that the abrasion resistant member is integrally formed into the elastic member.

14. A torque fluctuation absorber, comprising:

a first rotating member arranged to be rotatable;

a second rotating member arranged in a rotatable manner relative to the first rotating member;

a coil spring for buffering a torsion between the first rotating member and the second rotating member by means of an elastic force; and a cushion member arranged at an inside of the coil spring and buffering the torsion between the first rotating member and the second rotating member by means of an elastic force, wherein the cushion member includes an elastic member formed in a columnar shape, and an abrasion resistant member partly covering a side surface of the elastic member and including a greater abrasion resistance than an abrasion resistance of the elastic member, the abrasion resistant member includes a first abrasion resistant member provided at a first end of the elastic member and a second abrasion resistant member provided at a second end of the elastic member while being apart from the first abrasion resistant member, and the elastic member includes a first protruding portion protruding from a portion of an end surface of the elastic member beyond the first abrasion resistant member and the second abrasion resistant member.

15. The torque fluctuation absorber according to claim 14, wherein the elastic member is made of rubber or elastomer resin and the first and second abrasion resistant members are made of resin including a greater abrasion resistance than the rubber or the elastomer resin of the elastic member.

16. The torque fluctuation absorber according to claim 14, wherein one of the elastic member and the first or second abrasion resistant member includes a second protruding portion at a joint portion of the elastic member and the first or second abrasion resistant member and the other one of the elastic member and the first or second abrasion resistant member includes a recessed portion at the joint portion of the elastic member and the first or second abrasion resistant member.

17. The torque fluctuation absorber according to claim 16, wherein the second protruding portion and the recessed portion are formed continuously along an entire circumference of the joint portion of the elastic member and the first or second abrasion resistant member.

18. The torque fluctuation absorber according to claim 16, wherein the second protruding portion and the recessed portion are formed discontinuously in a circumferential direction of the joint portion of the elastic member and the first or second abrasion resistant member.

19. The torque fluctuation absorber according to claim 14, wherein one or both of the first abrasion resistant member and the second abrasion resistant member include a plurality of abrasion resistant members.

20. The torque fluctuation absorber according to claim 14, further comprising:

a seat member arranged between the coil spring, and the first rotating member and the second rotating member, wherein the first abrasion resistant member or the second abrasion resistant member is integrally formed into the seat member.

* * * * *